(12) United States Patent
Yang et al.

(10) Patent No.: US 10,567,062 B2
(45) Date of Patent: Feb. 18, 2020

(54) DOWNLINK CHANNEL RECONSTRUCTION METHOD AND APPARATUS

(71) Applicant: HUAWEI TECHNOLOGIES CO., LTD., Shenzhen, Guangdong (CN)

(72) Inventors: Fei Yang, Shanghai (CN); Zhiying Wang, Shanghai (CN); Chengsheng Que, Boulogne Billancourt (FR)

(73) Assignee: HUAWEI TECHNOLOGIES CO., LTD, Shenzhen, Guangdong (CN)

( * ) Notice: Subject to any disclaimer, the term of this patent is extended or adjusted under 35 U.S.C. 154(b) by 0 days.

(21) Appl. No.: 16/009,185

(22) Filed: Jun. 14, 2018

(65) Prior Publication Data
US 2018/0302143 A1 Oct. 18, 2018

Related U.S. Application Data

(63) Continuation of application No. PCT/CN2016/105435, filed on Nov. 11, 2016.

(30) Foreign Application Priority Data

Dec. 21, 2015 (CN) .......................... 2015 1 0960916

(51) Int. Cl.
*H04B 7/06* (2006.01)
*H04B 7/0413* (2017.01)
*H04L 5/00* (2006.01)

(52) U.S. Cl.
CPC ......... *H04B 7/0639* (2013.01); *H04B 7/0413* (2013.01); *H04B 7/0615* (2013.01); *H04L 5/0048* (2013.01)

(58) Field of Classification Search
CPC .. H04B 7/0639; H04B 7/0413; H04B 7/0615; H04B 7/0695; H04L 25/0202; H04L 5/0048
See application file for complete search history.

(56) References Cited

U.S. PATENT DOCUMENTS

2010/0008445 A1 1/2010 Khan
2010/0177844 A1 7/2010 Ko et al.
(Continued)

FOREIGN PATENT DOCUMENTS

CN 101867398 A 10/2010
CN 104539392 A 4/2015
(Continued)

*Primary Examiner* — Afshawn M Towfighi
(74) *Attorney, Agent, or Firm* — Womble Bond Dickinson (US) LLP

(57) ABSTRACT

This application discloses a downlink channel reconstruction method and apparatus. In one embodiment, the method includes: sending, by a base station, multiple different weighted pilot signals to a terminal, where each of the weighted pilot signals includes a product of a pilot signal and a weighting matrix; receiving, by the base station, multiple different optimal code words returned by the terminal, where each of the optimal code words is obtained based on a channel estimation of a weighted pilot signal; and reconstructing, by the base station, a downlink channel according to the multiple different optimal code words. According to the foregoing method, a quantization error can be reduced, so that a beam direction of a reconstructed channel correctly points to the terminal.

17 Claims, 2 Drawing Sheets

(56) References Cited

U.S. PATENT DOCUMENTS

| | | |
|---|---|---|
| 2011/0064008 A1 | 3/2011 | Guo |
| 2011/0200081 A1 | 8/2011 | Guo et al. |
| 2013/0077658 A1 | 3/2013 | Hui et al. |
| 2015/0003543 A1* | 1/2015 | Shirani-Mehr ....... H04W 76/10 375/260 |
| 2015/0030006 A1* | 1/2015 | Fujio .................... H04B 7/0456 370/336 |

FOREIGN PATENT DOCUMENTS

| | | |
|---|---|---|
| CN | 105099636 A | 11/2015 |
| WO | 2010148552 A1 | 12/2010 |
| WO | 2012125931 A1 | 9/2012 |
| WO | 2014073846 A1 | 5/2014 |

* cited by examiner

DOWNLINK CHANNEL RECONSTRUCTION METHOD AND APPARATUS

CROSS-REFERENCE TO RELATED APPLICATIONS

This application is a continuation of International Application No. PCT/CN2016/105435, filed on Nov. 11, 2016, which claims priority to Chinese Patent Application No. 201510960916.6, filed on Dec. 21, 2015. The disclosures of the aforementioned applications are hereby incorporated by reference in their entireties.

TECHNICAL FIELD

This application relates to the communications field, and in particular, to a downlink channel reconstruction method and apparatus.

BACKGROUND

As a multiple-input multiple-output (MIMO) technology can effectively improve spectral efficiency and a transmission rate, the technology has been widely applied to modern communications systems, for example, a multiuser wireless communications system. A base station (BS) in a multiuser MIMO downlink system communicates with multiple users by using a same time-frequency resource, and a user inevitably suffers interference from multiple users. To reduce such interference, beamforming is generally implemented at a base station end, so that a signal is transmitted directionally or received directionally.

According to an existing protocol, both a base station and a terminal store a set of precoding codebook, and the precoding codebook includes multiple precoding matrices that are used to indicate a beam direction. The precoding matrices are relatively complex; therefore, for ease of retrieval and transmission, each precoding matrix is set to be corresponding to one code word.

In a communication process, the base station sends pilot information to a user. After receiving a pilot signal, the user performs channel estimation according to the pilot signal, and selects, according to a channel estimation result, an optimal code word from the precoding codebook stored in the terminal. After selecting the optimal code word, the terminal encapsulates the optimal code word in a PMI (Precoding Matrix Indicator) message and sends the PMI message to the base station. After receiving the PMI message, the base station decapsulates the PMI message to obtain the optimal code word, and finds, according to the optimal code word, a corresponding precoding matrix from the precoding codebook stored in the base station. After finding the corresponding precoding matrix, the base station performs beamforming according to the precoding matrix that is found.

However, because a beam direction is continuous and unlimited and a precoding matrix is discrete and limited, a quantization error inevitably exists when the precoding matrix is used to indicate the beam direction. As a result, a beam cannot correctly point to the terminal. For example, as shown in FIG. 1, in an ideal state, directions of beams between a base station 110 and two terminals 120 should be shown by dashed lines in the figure, and correctly point to the terminals 120. However, as shown by solid lines in the figure, directions of beams between the base station 110 and the two terminals 120 deviate from correct directions due to a quantization error and cannot correctly point to the terminals 120.

SUMMARY

The present invention provides a downlink channel reconstruction method and apparatus, to reduce a quantization error, so that a beam direction of a reconstructed channel correctly points to a terminal.

According to a first aspect, this application provides a downlink channel reconstruction method, including:

sending, by a base station, multiple different weighted pilot signals to a terminal, where each of the weighted pilot signals is equal to a product of a pilot signal and a weighting matrix;

receiving, by the base station, multiple different optimal code words returned by the terminal, where each of the multiple optimal code words is obtained based on a channel estimation of a weighted pilot signal; and reconstructing, by the base station, a downlink channel according to the multiple different optimal code words.

In one embodiment, before the sending, by a base station, multiple different weighted pilot signals to a terminal, the method includes:

generating a pilot weighting codebook, where the pilot weighting codebook includes multiple different weighting matrices; and multiplying the multiple different weighting matrices by the pilot information, to obtain the multiple different weighted pilot signals.

In one embodiment, the generating a pilot weighting codebook includes:

generating a pilot weighting codebook $Q^{dist}$:

$$Q^{dist} = \left\{ Q_s^{dist} \mid Q_s^{dist} = I_{N_T} - 2\frac{u_s^{dist}(u_s^{dist})^H}{u_s^{2dist}}, s = 0, L, S-1 \right\},$$

where $I_{N_T}$ is an $N_T$-dimension identity matrix, $N_T$ is a quantity of antenna ports of the base station, s is a sequence number variable, S is a quantity of elements of the pilot weighting codebook $Q^{dist}$, $\mu_s^{dist} = (u_0^{dist}, u_1^{dist}, L, u_{S-1}^{dist})$, $$\mu_s^{dist} = \underset{\mu_r \atop r=0,L,R\mu_{r,i},\mu_{r,j}\in\mu_r}{\arg\max} \; \underset{i\neq j}{\min} \, d(u_{r,i}, u_{r,j}),$$

i, j, and r are free variables, R is a positive integer, $$\mu_r = \left\{ u_{r,s} \mid u_{r,s} = \frac{v_{r,s}}{v_{r,s}}, s = 0, \ldots, S-1 \right\},$$

and $v_{r,s}$ is an element in a random $N_T$-dimension complex vector set $\{v_{r,0}, \ldots, v_{r,S-1}\}$.

In one embodiment, the generating a pilot weighting codebook includes:

generating a pilot weighting codebook $Q^{ang}$:

$$Q^{ang} = \left\{ Q_s^{ang} \mid Q_s^{ang} = I_{N_T} - 2\frac{u_s^{ang}(u_s^{ang})^H}{u_s^{2ang}}, s = 0, L, S-1 \right\},$$

where $I_{N_T}$ is an $N_T$-dimension identity matrix, $N_T$ is a quantity of antenna ports of the base station, s is a sequence number variable, S is a quantity of elements of the pilot weighting codebook $Q^{ang}$;

$$u_s^{ang} = \begin{bmatrix} \begin{bmatrix} 1 \\ e^{j\theta_s} \\ e^{j2\theta_s} \\ L \\ e^{j(\frac{N_T}{2}-1)\theta_s} \end{bmatrix} \\ \begin{bmatrix} 1 \\ e^{j\theta_s} \\ e^{j2\theta_s} \\ L \\ e^{j(\frac{N_T}{2}-1)\theta_s} \end{bmatrix} e^{j\varphi_s} \end{bmatrix};$$

and a value range of $\theta_S$ is $$\left(0, \frac{\pi}{4}\right),$$

and a value range of $\varphi_S$ is $$\left(0, \frac{\pi}{2}\right).$$

In one embodiment, the reconstructing, by the base station, a downlink channel according to the multiple different optimal code words includes:

calculating matrices corresponding to the multiple different optimal code words returned by the terminal, to obtain multiple intermediate variables $Y_t$, where $Y_t = y_t y_t^H$;

$y_t = Q_{s(t)} w(t)$; and t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

performing weighting according to the multiple intermediate variables to obtain an average result Z(t), where $$Z(t) = \frac{1}{S}\sum_{r=0}^{S-1} Y(t-r),$$

r is an free variable, and S is a quantity of the intermediate variables; and performing singular value decomposition on the average result Z(t) to obtain a principal eigenvector, and reconstructing the downlink channel according to the principal eigenvector.

In one embodiment, the reconstructing, by the base station, a downlink channel according to the multiple different optimal code words includes:

calculating matrices corresponding to the multiple different optimal code words returned by the terminal, to obtain multiple intermediate variables $Y_t$, where $Y_t = y_t y_t^H$;

$y_t = Q_{s(t)} w(t)$; and t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

performing weighting according to the multiple intermediate variables to obtain an average result Z(t), where $$Z(t) = \frac{1}{S}\sum_{r=0}^{S-1} a(r)Y(t-r),$$

r is an free variable, S is a quantity of the intermediate variables, $0 < a_0 < a_1 < L < a_{S-1} < 1$, and $\Sigma_{r=0}^{S-1} a(r) = 1$; and performing singular value decomposition on the average result Z(t) to obtain a principal eigenvector, and reconstructing the downlink channel according to the principal eigenvector.

In one embodiment, the reconstructing, by the base station, a downlink channel according to the multiple different optimal code words includes:

calculating matrices corresponding to the multiple different optimal code words returned by the terminal, to obtain multiple intermediate variables $Y_t$, where $Y_t = y_t y_t^H$;

$y_t = Q_{s(t)} w(t)$; and t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

performing weighting according to the multiple intermediate variables to obtain an average result Z(t), where $Z(t) = \alpha Z(t-1) + (1-\alpha) Y_t$, and $0 < \alpha < 1$; and performing singular value decomposition on the average result Z(t) to obtain a principal eigenvector, and reconstructing the downlink channel according to the principal eigenvector.

In one embodiment, the method includes:

constructing multiple real vectors $b_t$ according to matrices corresponding to the multiple different optimal code words returned by the terminal, where $b_t = [e_1, L, e_{N_T}, f_{1,2}, g_{1,2}, L, f_{1,N_T}, g_{1,N_T}, f_{2,3}, g_{2,3}, L, f_{2,N_T}, g_{2,N_T}, L, f_{N_T-1,N_T}, g_{N_T-1,N_T}]^T$, k and l are free variables, $e_k = |a_{t,k}|^2$, $f_{k,l} = 2R(a_{t,k}^* a_{t,l})$, $g_{k,l} = -2I(a_{t,k}^* a_{t,l})$, R(g) represents an operation of obtaining a real part of a complex number, I(g) represents an operation of obtaining an imaginary part of a complex number, $[a_{t,l}, L, a_{t,N_T}]^T = Q_{s(t)} w(t)$, t is a time point at which a weighted pilot signal is sent, $Q_{s(t)}$ is a weighting matrix used for the weighted pilot signal that is sent at the time point t, and w(t)

is a precoding matrix corresponding to an optimal code word that is returned by the terminal according to the weighted pilot signal sent at the time point t;

forming a linear function (1) according to the multiple real vectors $b_t$, and solving the linear function (1) to obtain a vector $X=[x_1 \text{ L } x_{N_T^2}]^T$, where $$[b_t \text{ L } b_{t-T+1}]^T \begin{bmatrix} x_1 \\ M \\ x_{N_T^2} \end{bmatrix} = \begin{bmatrix} \hat{\gamma}_t \\ M \\ \hat{\gamma}_{t-T+1} \end{bmatrix}, \quad (1)$$

$\hat{\gamma}$ is a quantized value of $\gamma$, $$\gamma = \frac{P}{N_o} w^H H^H H w,$$

P is a transmit power of the base station, $N_o$ is a downlink-noise interference power measured by the terminal, $$w = \max_{w_i \in W} w_i^H H^H H w_i,$$

$W=\{w_0, \text{ L}, w_{L-1}\}$ is a precoding codebook, L is a quantity of precoding matrices $w_i$ in the precoding codebook, $H=\{h_0, \text{ L}, h_{N_T}\}$, and $h_i$ represents a channel from an antenna port i of the base station to each antenna of a user; and reconstructing a downlink channel $\hat{R}$ according to the vector $X=\{x_1 \text{ L } x_{N_T^2}\}^T$, where $$\hat{R} = \begin{bmatrix} \hat{r}_{1,1} & \hat{r}_{1,2} & L & \hat{r}_{1,N_T} \\ \hat{r}_{1,2}^* & \hat{r}_{2,2} & L & \hat{r}_{2,N_T} \\ M & M & O & M \\ \hat{r}_{1,N_T}^* & \hat{r}_{2,N_T}^* & L & \hat{r}_{N_T,N_T}^* \end{bmatrix};$$

a diagonal element of $\hat{R}$ is $\hat{r}_{k,k}=x_k$;
an upper triangular element of $\hat{R}$ is $\hat{r}_{k,l}=x_{p(k,l)}+j \cdot x_{p(k,l)+1}$, k=1, L, $N_T-1$; k<l;
p(k,l)=$N_T+(2N_T-k)(k-1)+2(l-k-1)+1$, where k and l are free variables, and $N_T$ is a quantity of antenna ports of the base station; and
a lower triangular element of $\hat{R}$ and an upper triangular element of $\hat{R}$ are conjugately symmetrical around a diagonal.

According to a second aspect, this application provides a downlink channel reconstruction apparatus, including: a sending module, a calculation module, and a reconstruction module, where the sending module is configured to send multiple different weighted pilot signals to a terminal, where each of the weighted pilot signals is equal to a product of a pilot signal and a weighting matrix;

the calculation module is configured to receive multiple different optimal code words returned by the terminal, where each of the optimal code words is obtained based on a channel estimation of a weighted pilot signal; and the reconstruction module is configured to reconstruct a downlink channel according to the multiple different optimal code words.

In one embodiment, the apparatus further includes a generation module, where the generation module is configured to generate a pilot weighting codebook, where the pilot weighting codebook includes multiple different weighting matrices; and the calculation module is configured to multiply the multiple different weighting matrices by the pilot information, to obtain the multiple different weighted pilot signals.

In one embodiment, the generation module is further configured to generate a pilot weighting codebook $Q^{dist}$:

$$Q^{dist} = \left\{ Q_s^{dist} \mid Q_s^{dist} = I_{N_T} - 2 \frac{u_s^{dist}(u_s^{dist})^H}{u_s^{2dist}}, s = 0, L, S-1 \right\},$$

where $I_{N_T}$ is an $N_T$-dimension identity matrix, $N_T$ is a quantity of antenna ports of the base station, s is a sequence number variable, S is a quantity of elements of the pilot weighting codebook $Q^{dist}$, $\mu_s^{dist}=(u_0^{dist}, u_1^{dist}, L, u_{S-1}^{dist})$, $$\mu_s^{dist} = \arg\max_{\mu_r} \min_{i \neq j} d(u_{r,i}, u_{r,j}),$$
$$r=0, L, R u_{r,i}, u_{r,j} \in \mu_r$$

i, j, and r are free variables, R is a positive integer, $$\mu_r \left\{ u_{r,s} \mid u_{r,s} = \frac{v_{r,s}}{v_{r,s}}, s=0, \ldots, S-1 \right\},$$

and $v_{r,s}$ is an element in a random $N_T$-dimension complex vector set $\{v_{r,0}, \ldots, v_{r,S-1}\}$.

In one embodiment, the generating module is configured to generate a pilot weighting codebook $Q^{ang}$:

$$Q^{ang} = \left\{ Q_s^{ang} \mid Q_s^{ang} = I_{N_T} - 2 \frac{u_s^{ang}(u_s^{ang})^H}{u_s^{2ang}}, s=0, L, S-1 \right\},$$

where $I_{N_T}$ is an $N_T$-dimension identity matrix, $N_T$ is a quantity of antenna ports of the base station, s is a sequence number variable, S is a quantity of elements of the pilot weighting codebook $Q^{ang}$;

$$u_s^{ang} = \begin{bmatrix} \begin{bmatrix} 1 \\ e^{j\theta_s} \\ e^{j2\theta_s} \\ L \\ e^{j\left(\frac{N_T}{2}-1\right)\theta_s} \end{bmatrix} \\ \begin{bmatrix} 1 \\ e^{j\theta_s} \\ e^{j2\theta_s} \\ L \\ e^{j\left(\frac{N_T}{2}-1\right)\theta_s} \end{bmatrix} e^{j\varphi_s} \end{bmatrix};$$

and
a value range of $\theta_S$ is $$\left(0, \frac{\pi}{4}\right),$$

and a value range of $\varphi_S$ is $$\left(0, \frac{\pi}{2}\right).$$

In one embodiment, the reconstruction module includes:

a calculation unit, configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

an averaging unit, performing weighting according to the multiple intermediate variables to obtain an average result Z(t), where $$Z(t) = \frac{1}{S} \sum_{r=0}^{S-1} Y(t-r),$$

r is an free variable, and S is a quantity of the intermediate variables;

a reconstruction unit, configured to perform singular value decomposition on the average result Z(t) to obtain a principal eigenvector, and reconstructing the downlink channel according to the principal eigenvector.

In one embodiment, the apparatus further includes:

a calculation unit, configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

an averaging unit, configured to perform weighting according to the multiple intermediate variables to obtain an average result Z(t), where $$Z(t) = \frac{1}{S} \sum_{r=0}^{S-1} a(r) Y(t-r),$$

r is an free variable, and S is a quantity of the intermediate variables; $0 < a_0 < a_1 < L < a_{S-1} < 1$, and $\Sigma_{r=0}^{S-1} a(r) = 1$; and a reconstruction unit, configured to perform singular value decomposition on the average result Z(t) to obtain a principal eigenvector, and reconstruct the downlink channel according to the principal eigenvector.

In one embodiment, the apparatus further includes:

a calculation unit, configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

an averaging unit, performing weighting according to the multiple intermediate variables to obtain an average result Z(t), where $$Z(t) = \alpha Z(t-1) + (1-\alpha) Y_t, \text{ and } 0 < \alpha < 1; \text{ and}$$

a reconstruction unit, configured to perform singular value decomposition on the average result Z(t) to obtain a principal eigenvector, and reconstruct the downlink channel according to the principal eigenvector.

In one embodiment, the apparatus includes:

a construction unit, configured to construct multiple real vectors $b_t$ according to matrices corresponding to the multiple different optimal code words returned by the terminal, where $$b_t = [e_1, L, e_{N_T}, f_{1,2}, g_{1,2}, L, f_{1,N_T}, g_{1,N_T}, f_{2,3}, g_{2,3}, L, f_{2,N_T}, g_{2,N_T}, L, f_{N_T-1,N_T}, g_{N_T-1,N_T}]^T,$$

k and l are free variables, $e_k = |a_{t,k}|^2$, $f_{k,l} = 2R(a_{t,k}^* a_{t,l})$, $g_{k,l} = -2I(a_{t,k}^* a_{t,l})$, R(g) represents an operation of obtaining a real part of a complex number, I(g) represents an operation of obtaining an imaginary part of a complex number $[a_{t,l}, L, a_{t,N_T}]^T = Q_{s(t)} w(t)$, t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

a solving unit, configured to form a linear function (1) according to the multiple real vectors $b_t$, and solve the linear function (1) to obtain a vector $X = [x_1 \ L \ x_{N_T^2}]^T$, where $$[b_t \ L \ b_{t-T+1}]^T \begin{bmatrix} x_1 \\ M \\ x_{N_T^2} \end{bmatrix} = \begin{bmatrix} \hat{\gamma}_t \\ M \\ \hat{\gamma}_{t-T+1} \end{bmatrix}, \quad (1)$$

$\hat{\gamma}$ is a quantized value of $\gamma$, $$\gamma = \frac{P}{N_o} w^H H^H H w,$$

P is a transmit power of the base station, $N_o$ is a downlink-noise interference power measured by the terminal, $$w = \max_{w_i \in W} w_i^H H^H H w_i,$$

$W = \{w_0, L, w_{L-1}\}$ is a precoding codebook, L is a quantity of precoding matrices $w_i$ in the precoding codebook, $H = \{h_0, L, h_{N_T}\}$, and $h_i$ represents a channel from an antenna port i of the base station to each antenna of a user; and a reconstruction unit, configured to reconstruct a downlink channel $\hat{R}$ according to the vector $X = \{x_1 \ L \ x_{N_T^2}\}^T$, where $$\hat{R} = \begin{bmatrix} \hat{r}_{1,1} & \hat{r}_{1,2} & L & \hat{r}_{1,N_T} \\ \hat{r}_{1,2}^* & \hat{r}_{2,2} & L & \hat{r}_{2,N_T} \\ M & M & O & M \\ \hat{r}_{1,N_T}^* & \hat{r}_{2,N_T}^* & L & \hat{r}_{N_T,N_T}^* \end{bmatrix};$$

a diagonal element of $\hat{R}$ is $\hat{r}_{k,k} = x_k$;
an upper triangular element of $\hat{R}$ is $\hat{r}_{k,l} = x_{p(k,l)} + j \cdot x_{p(k,l)+1}$, k=1, L, $N_T-1$; k<l;
$p(k,l) = N_T + (2N_T - k)(k-1) + 2(l-k-1) + 1$, where k and l are free variables, and $N_T$ is a quantity of antenna ports of the base station; and a lower triangular element of $\hat{R}$ and an upper triangular element of $\hat{R}$ are conjugately symmetrical around a diagonal.

According to a third aspect, this application provides a base station, including a transmitter, a receiver, and a processor, where the transmitter is configured to send multiple different weighted pilot signals to a terminal, where each of the weighted pilot signals is equal to a product of a pilot signal and a weighting matrix;

the receiver is configured to receive multiple different optimal code words returned by the terminal, where each of the optimal code words is obtained based on a channel estimation of a weighted pilot signal; and the processor is configured to reconstruct a downlink channel according to the multiple different optimal code words.

In one embodiment,
the processor is further configured to generate a pilot weighting codebook, where the pilot weighting codebook includes multiple different weighting matrices; and the processor is further configured to multiply the multiple different weighting matrices by the pilot information, to obtain the multiple different weighted pilot signals.

In one embodiment, the processor is further configured to generate a pilot weighting codebook $Q^{dist}$:

$$Q^{dist} = \left\{ Q_s^{dist} \mid Q_s^{dist} = I_{N_T} - 2 \frac{u_s^{dist}(u_s^{dist})^H}{u_s^{2dist}}, s = 0, L, S-1 \right\},$$

where
$I_{N_T}$ is an $N_T$-dimension identity matrix, $N_T$ is a quantity of antenna ports of the base station, s is a sequence number variable, S is a quantity of elements of the pilot weighting codebook $Q^{dist}$, $\mu_s^{dist} = (u_0^{dist}, u_1^{dist}, L, u_{S-1}^{dist})$, $$\mu_s^{dist} = \arg\max_{\mu_r} \min_{i \neq j} d(u_{r,i}, u_{r,j}),$$
$$r=0,L,R u_{r,i},u_{r,j} \in \mu_r$$

i, j, and r are free variables, R is a positive integer, $$\mu_r = \left\{ u_{r,s} \mid u_{r,s} = \frac{v_{r,s}}{v_{r,s}}, s = 0, \ldots, S-1 \right\},$$

and $v_{r,s}$ is an element in a random $N_T$-dimension complex vector set $\{v_{r,0}, \ldots, v_{r,S-1}\}$.

In one embodiment, the processor is further configured to generate a pilot weighting codebook $Q^{ang}$:

$$Q^{ang} = \left\{ Q_s^{ang} \mid Q_s^{ang} = I_{N_T} - 2 \frac{u_s^{ang}(u_s^{ang})^H}{u_s^{2ang}}, s = 0, L, S-1 \right\},$$

where
$I_{N_T}$ is an $N_T$-dimension identity matrix, $N_T$ is a quantity of antenna ports of the base station, s is a sequence number variable, S is a quantity of elements of the pilot weighting codebook $Q^{ang}$;

$$u_s^{ang} = \begin{bmatrix} \begin{bmatrix} 1 \\ e^{j\theta_s} \\ e^{j2\theta_s} \\ L \\ e^{j(\frac{N_T}{2}-1)\theta_s} \end{bmatrix} \\ \begin{bmatrix} 1 \\ e^{j\theta_s} \\ e^{j2\theta_s} \\ L \\ e^{j(\frac{N_T}{2}-1)\theta_s} \end{bmatrix} e^{j\varphi_s} \end{bmatrix};$$

and
a value range of $\theta_S$ is $$\left(0, \frac{\pi}{4}\right),$$

and a value range of $\varphi_S$ is $$\left(0, \frac{\pi}{2}\right).$$

In one embodiment, the processor is further configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

the processor is further configured to performs weighting according to the multiple intermediate variables to obtain an average result Z(t), where $$Z(t) = \frac{1}{S}\sum_{r=0}^{S-1} Y(t-r),$$

r is an free variable, and S is a quantity of the intermediate variables; and the processor is further configured to perform singular value decomposition on the average result Z(t) to obtain a principal eigenvector, and reconstruct the downlink channel according to the principal eigenvector.

In one embodiment, the processor is further configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

the processor is further configured to perform weighting according to the multiple intermediate variables to obtain an average result Z(t), where $$Z(t) = \frac{1}{S}\sum_{r=0}^{S-1} a(r)Y(t-r),$$

r is an free variable, S is a quantity of the intermediate variables, $0<a_0<a_1<L<a_{S-1}<1$, and $\Sigma_{r=0}^{S-1}a(r)=1$; and the processor is further configured to perform singular value decomposition on the average result Z(t) to obtain a principal eigenvector, and reconstruct the downlink channel according to the principal eigenvector.

In one embodiment, the processor is further configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

the processor is further configured to perform weighting according to the multiple intermediate variables to obtain an average result Z(t), where $Z(t)=\alpha Z(t-1)+(1-\alpha)Y_t$ and $0<\alpha<1$; and the processor is further configured to perform singular value decomposition on the average result Z(t) to obtain a principal eigenvector, and reconstruct the downlink channel according to the principal eigenvector.

In one embodiment, the processor is further configured to construct multiple real vectors $b_t$ according to matrices corresponding to the multiple different optimal code words returned by the terminal, where $b_t=[e_1,L,e_{N_T},f_{1,2},g_{1,2},L,f_{1,N_T},g_{1,N_T},f_{2,3},g_{2,3},L,f_{2,N_T},g_{2,N_T},$
$L,f_{N_T-1,N_T},g_{N_T-1,N_T}]^T,$ k and l are free variables, $e_k=|a_{t,k}|^2$, $f_{k,l}=2R(a_{t,k}^* a_{t,l})$, $g_{k,l}=-2I(a_{t,k}^* a_{t,l})$, R(g) represents an operation of obtaining a real part of a complex number, I(g) represents an operation of obtaining an imaginary part of a complex number $[a_{t,l}, L, a_{t,N_T}]^T=Q_{s(t)}w(t)$, t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

the processor is further configured to form a linear function (1) according to the multiple real vectors $b_t$, and solve the linear function (1) to obtain a vector $X=[x_1 \ L \ x_{N_T^2}]^T$, where $$[b_t \ L \ b_{t-T+1}]^T \begin{bmatrix} x_1 \\ M \\ x_{N_T^2} \end{bmatrix} = \begin{bmatrix} \hat{y}_t \\ M \\ \hat{y}_{t-T+1} \end{bmatrix}, \quad (1)$$

$\hat{\gamma}$ is a quantized value of γ, $$\gamma = \frac{P}{N_o} w^H H^H H w,$$

P is a transmit power of the base station, $N_o$ is a downlink-noise interference power measured by the terminal, $$w = \max_{w_i \in W} w_i^H H^H H w_i,$$

$W=\{w_0, L, w_{L-1}\}$ is a precoding codebook, L is a quantity of precoding matrices $w_i$ in the precoding codebook, $H=\{h_0, L, h_{N_T}\}$, and $h_i$ represents a channel from an antenna port i of the base station to each antenna of a user; and the processor is further configured to reconstruct a downlink channel $\hat{R}$ according to the vector $X=\{x_1 \ L \ x_{N_T^2}\}^T$, where $$\hat{R} = \begin{bmatrix} \hat{r}_{1,1} & \hat{r}_{1,2} & L & \hat{r}_{1,N_T} \\ \hat{r}_{1,2}^* & \hat{r}_{2,2} & L & \hat{r}_{2,N_T} \\ M & M & O & M \\ \hat{r}_{1,N_T}^* & \hat{r}_{2,N_T}^* & L & \hat{r}_{N_T,N_T}^* \end{bmatrix};$$

a diagonal element of $\hat{R}$ is $\hat{r}_{k,k}=x_k$;
an upper triangular element of $\hat{R}$ is $\hat{r}_{k,l}=x_{p(k,l)}+j \cdot x_{p(k,l)+1}$, k=1, L, $N_T-1$; k<l;
$p(k,l)=N_T+(2N_T-k)(k-1)+2(l-k-1)+1$, where k and l are free variables, and $N_T$ is a quantity of antenna ports of the base station; and a lower triangular element of $\hat{R}$ and an upper triangular element of $\hat{R}$ are conjugately symmetrical around a diagonal.

According to embodiments of the present invention, the base station sends the different weighted pilot signals to the terminal for multiple times; after receiving the multiple different weighted pilot signals, the terminal performs channel estimation according to the multiple different weighted pilot signals and returns the multiple optimal code words according to a channel estimation result; and then, the base station performs reconstruction according to the multiple optimal code words. A quantization error is reduced when averaging is performed according to the multiple optimal code words, so that a beam direction of a reconstructed channel correctly points to the terminal.

DESCRIPTION OF EMBODIMENTS

In the following description, to illustrate rather than limit, specific details such as a particular system structure, an interface, and a technology are provided to make a thorough understanding of this application. However, a person skilled in the art should know that this application may be practiced in other implementations without these specific details. In other cases, detailed descriptions of well-known apparatuses, circuits, and methods are omitted, so that this application is described without being obscured by unnecessary details.

Figure 2:
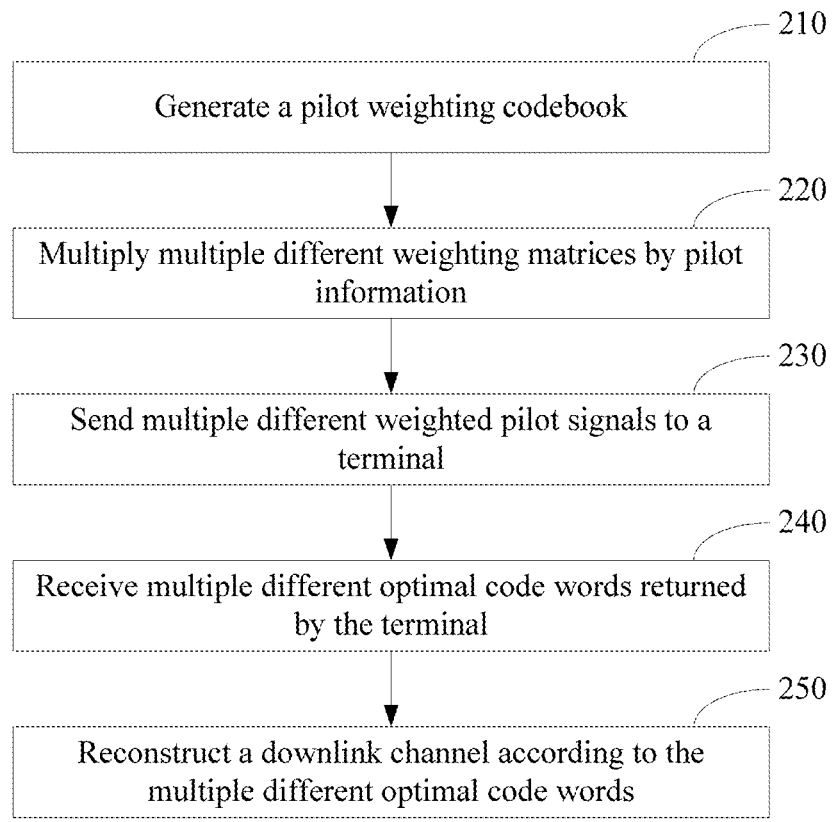
FIG. 2 is a flowchart of a downlink channel reconstruction method according to the present invention.

Referring to FIG. 2, FIG. 2 is a flowchart of a downlink channel reconstruction method according to the present invention. The downlink channel reconstruction method in this implementation includes the following operations.

For operation 210: A base station generates a pilot weighting codebook.

The base station generates the pilot weighting codebook in the following two manners:

(1) Generating a pilot weighting codebook $Q^{dist}$:

$$Q^{dist} = \left\{ Q_s^{dist} \mid Q_s^{dist} = I_{N_T} - 2\frac{u_s^{dist}(u_s^{dist})^H}{u_s^{2dist}}, s = 0, L, S-1 \right\},$$

where $I_{N_T}$ is an $N_T$-dimension identity matrix, $N_T$ is a quantity of antenna ports of the base station, s is a sequence number variable, S is a quantity of elements of the pilot weighting codebook $Q^{dist}$, $\mu_s^{dist} = (u_0^{dist}, u_1^{dist}, L, u_{S-1}^{dist})$, $$\mu_s^{dist} = \underset{\mu_r}{\arg\max} \underset{i \neq j}{\min} d(u_{r,i}, u_{r,j}),$$
$$r=0,L,R u_{r,i}, u_{r,j} \in \mu_r$$

i, j, and r are free variables, R is a positive integer, $$\mu_r = \left\{ u_{r,s} \mid u_{r,s} = \frac{v_{r,s}}{v_{r,s}}, s = 0, \ldots, S-1 \right\},$$

and $v_{r,s}$ is an element in a random $N_T$-dimension complex vector set $\{v_{r,0}, \ldots, v_{r,S-1}\}$.

Specifically, a computer randomly generates R sets that each includes S $N_T$-dimension complex vectors. A group of random $N_T$-dimension complex vectors generated at the $r^{th}$ time is recoded as $\{v_{r,0}, \ldots, v_{r,S-1}\}$, and norm normalization is performed on the random $N_T$-dimension complex vectors to obtain the $r^{th}$ group of Householder basis vectors $\mu_r$:

$$\mu_r = \left\{ u_{r,s} \mid u_{r,s} = \frac{v_{r,s}}{v_{r,s}}, s = 0, \ldots, S-1 \right\}.$$

The norm normalization is performed on all the R groups of random $N_T$-dimension complex vectors that are randomly generated by the computer, to obtain R groups of Householder basis vectors.

A group of Householder basis vectors with a greatest minimum chordal distance is selected from the R groups of Householder basis vectors. A chordal distance d(a,b) is defined as:

$$d(a, b) = \left\| \frac{1}{\sqrt{2}} \frac{aa^H}{a^2} - \frac{bb^H}{b^2} \right\|_F,$$

where a,b are complex vectors, and $\|A\|_F$ is a Frobenius norm of a matrix A.

Therefore, the group $\mu_s^{dist}$ with the greatest minimum chordal distance in the R groups of Householder basis vectors is recorded as:

$$\mu_s^{dist} = \underset{\mu_r}{\arg\max} \underset{i \neq j}{\min} d(u_{r,i}, u_{r,j}).$$
$$r=0,L,R u_{r,i}, u_{r,j} \in \mu_r$$

Elements in the group $\mu_s^{dist} = (u_0^{dist}, u_1^{dist}, L, u_{S-1}^{dist})$ with the greatest minimum chordal distance are used as basis vectors to construct a pilot weighting codebook in a Householder matrix form. A Householder matrix is defined as:

$$H = I_{N_T} - 2\frac{uu^H}{\|u\|^2},$$

where $I_{N_T}$ is $N_T$-dimension identity matrix, $N_T$ is the quantity of antenna ports of the base station, u is an any $N_T$-dimension complex vector, and $\|u\|$ is a Euclidean norm of u.

Therefore, the pilot weighting codebook in the Householder matrix form is $Q^{dist}$:

$$Q^{dist} = \left\{ Q_s^{dist} \mid Q_s^{dist} = I_{N_T} - 2\frac{u_s^{dist}(u_s^{dist})^H}{u_s^{2dist}}, s = 0, L, S-1 \right\}.$$

(2) Generating a pilot weighting codebook $Q^{ang}$:

$$Q^{ang} = \left\{ Q_s^{ang} \mid Q_s^{ang} = I_{N_T} - 2\frac{u_s^{ang}(u_s^{ang})^H}{u_s^{2ang}}, s = 0, L, S-1 \right\},$$

where $I_{N_T}$ is an $N_T$-dimension identity matrix, $N_T$ is a quantity of antenna ports of the base station, s is a sequence number variable, S is a quantity of elements of the pilot weighting codebook $Q^{ang}$, and a basis vector is:

$$u_s^{ang} = \begin{bmatrix} \begin{bmatrix} 1 \\ e^{j\theta_s} \\ e^{j2\theta_s} \\ L \\ e^{j\left(\frac{N_T}{2}-1\right)\theta_s} \end{bmatrix} \\ \begin{bmatrix} 1 \\ e^{j\theta_s} \\ e^{j2\theta_s} \\ L \\ e^{j\left(\frac{N_T}{2}-1\right)\theta_s} \end{bmatrix} e^{j\varphi_s} \end{bmatrix};$$

and
a value range of $\theta_S$ is $$\left(0, \frac{\pi}{4}\right),$$

and a value range of $\varphi_S$ is $$\left(0, \frac{\pi}{2}\right).$$

For example, when the quantity $N_T$ of antenna ports of the base station is 1, the basis vector $u_s^{ang}$ is:

$$u_s^{ang} = \begin{bmatrix} 1 \\ e^{j\theta_s} \end{bmatrix},$$

where
a phase offset is $$\theta_s = \frac{2\pi s}{S},$$

s=0, 1, L, S−1.

When the quantity $N_T$ of antenna ports of the base station is 4, the basis vector $u_s^{ang}$ is:

$$u_s^{ang} = \begin{bmatrix} \begin{bmatrix} 1 \\ e^{j\theta_{s_1}} \end{bmatrix} \\ \begin{bmatrix} 1 \\ e^{j\theta_{s_1}} \end{bmatrix} e^{j\varphi_{s_2}} \end{bmatrix},$$

where
phase offsets are $$\theta_{s_1} = \frac{2\pi s_1}{S},$$

$s_1$=0, 1, L, $S_1$−1 and $$\varphi_{s_2} = \frac{2\pi s_2}{S},$$

$s_2$=0, 1, L, $S_2$−1. $S_1 \times S_2 = S$ is ensured, that is, quantities of the two phase offsets are integer factors of a size of the pilot weighting codebook; and a relationship between a general index and two subindexes is $s=(s_1-1)S_2+s_2$.

When the quantity $N_T$ of antenna ports of the base station is 8, the basis vector $u_s^{ang}$ is:

$$u_s^{ang} = \begin{bmatrix} \begin{bmatrix} 1 \\ e^{j\theta_{s_1}} \\ e^{j2\theta_{s_1}} \\ e^{j3\theta_{s_1}} \end{bmatrix} \\ \begin{bmatrix} 1 \\ e^{j\theta_{s_1}} \\ e^{j2\theta_{s_1}} \\ e^{j3\theta_{s_1}} \end{bmatrix} e^{j\varphi_{s_2}} \end{bmatrix},$$

where
phase offsets are $$\theta_{s_1} = \frac{2\pi s_1}{4S},$$

$s_1$=0, 1, L, $S_1$−1 and $$\varphi_{s_2} = \frac{2\pi s_2}{S},$$

$s_2$=0, 1, L, $S_2$−1. $S_1 \times S_2 = S$ is ensured, that is, quantities of the two phase offsets are integer factors of a size of the pilot weighting codebook; and a relationship between a general index and two subindexes is $s=(s_1-1)S_2+s_2$.

For operation 220: Multiply multiple different weighting matrices by pilot information, to obtain multiple different weighted pilot signals.

For ease of description, in the following, both the pilot weighting codebook $Q^{dist}$ and the pilot weighting codebook $Q^{ang}$ are recorded as:

$$Q_s = \begin{bmatrix} q_{0,0}^{(s)} & q_{1,0}^{(s)} & L & q_{N_T-1,0}^{(s)} \\ q_{0,1}^{(s)} & q_{1,1}^{(s)} & L & q_{N_T-1,1}^{(s)} \\ M & M & O & M \\ q_{0,N_T-1}^{(s)} & q_{1,N_T-1}^{(s)} & L & q_{N_T-1,N_T-1}^{(s)} \end{bmatrix},$$

where i and j are free variables, $q_{i,j}^{(s)}$ is an element in $Q_s$, and $N_T$ is the quantity of antenna ports of the base station.

In an existing LTE protocol, a pilot signal of an antenna port of a base station is transmitted on an orthogonal channel resource so that a terminal can separately estimate channels from antenna ports of the base station to the terminal, thereby avoiding mutual interference between pilot signals of the antenna ports. Assuming that a pilot signal needs to be transmitted on a pilot resource $R_l$(l=0, 1, L, $N_T$−1) through an antenna port l is $x_l$ (another antenna port is not used to transmit any pilot signal on the pilot resource) when pilot weighting is not performed. According to one embodiment of the present invention, the antenna ports l of the base station actually need to be used to transmit signals on all pilot resources, and a weighted pilot signal that is obtained by weighting $Q_s$ and that is transmitted on the pilot resource $R_l$ using an antenna port is:

$$\%x_i(s, l) = q_{i,j}^{(s)}x_l.$$

For operation 230: The base station sends the multiple different weighted pilot signals to a terminal.

The base station sends the multiple different weighted pilot signals to the terminal. After receiving the multiple weighted pilot signals, the terminal performs channel estimation according to the weighted pilot signals and selects multiple different optimal code words according to a channel estimation result.

A matrix formed by channels from the base station to the terminal is recorded as H=[$h_0$, L, $h_{N_T-1}$], and $h_i$ represents a vector of a channel from the antenna port i of the base station to each antenna of the terminal. When this pilot transmission manner is used, a multi-antenna signal received on the pilot resource $R_l$ by a user is (noise and interference are not considered):

$$r_i(s, l) = \sum_{i=0}^{N_T-1} h_i x\%(s, l) = [h_0, L, h_{N_T-1}] \begin{bmatrix} q_{l,0}^{(s)} \\ M \\ q_{l,N_T-1}^{(s)} \end{bmatrix}.$$

That is, a downlink equivalent channel vector detected on the pilot resource $R_l$ by the user is:

$$h_{s,l}^\% = [h_0, L, h_{N_T-1}] \begin{bmatrix} q_{l,0}^{(s)} \\ M \\ q_{l,N_T-1}^{(s)} \end{bmatrix}.$$

The real channel vector [$h_0$, L, $h_{N_T-1}$] is right-multiplied by the $l^{th}$ column of the weighting matrix $Q_s$. The terminal does not know that the base station has performed weighting on a pilot signal and has sent a weighted pilot signal; therefore, the terminal determines that a channel detected on the pilot resource $R_l$ is a channel from the antenna port l of the base station to the terminal. When results of channel estimation performed on all pilot resources $R_0$, L, $R_{N_T-1}$ are combined, an entire downlink channel $H^\%$=[$h_{s,0}^\%$, L, $h_{s,N_T-1}^\%$]=HQ existing from the user's perspective is obtained.

For operation 240: The base station receives multiple different optimal code words returned by the terminal.

For operation 250: The base station reconstructs a downlink channel according to the multiple different optimal code words.

The base station may reconstruct the downlink channel according to the multiple different optimal code words using two reconstruction methods.

In a first reconstruction method, a part of channel state information is reconstructed. The part of the channel state information refers to a principal eigenvector of a channel-related matrix. This reconstruction method includes but is not limited to: (a) a direct average algorithm; (b) a finite impulse response (FIR) filter algorithm; and (c) an Alpha filter algorithm.

(a) The direct average algorithm: This algorithm is applied to a scenario in which a channel change is slow enough.

Matrices corresponding to the multiple different optimal code words returned by the terminal are calculated to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t.

Weighting is performed according to the multiple intermediate variables to obtain an average result Z(t), where $$Z(t) = \frac{1}{S} \sum_{r=0}^{S-1} Y(t-r),$$

r is an free variable, and S is a quantity of the intermediate variables.

Singular value decomposition is performed on the average result Z(t) to obtain the principal eigenvector, and the downlink channel is reconstructed according to the principal eigenvector.

(b) The FIR filter algorithm: This algorithm is applied to a scenario in which a change of a channel along with time cannot be neglected.

Matrices corresponding to the multiple different optimal code words returned by the terminal are calculated to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t.

Weighting is performed according to the multiple intermediate variables to obtain an average result Z(t), where $$Z(t) = \frac{1}{S}\sum_{r=0}^{S-1} a(r)Y(t-r);$$

and r is an free variable, S is a quantity of the intermediate variables, $0<a_0<a_1<L<a_{S-1}<1$, and $\Sigma_{r=0}^{S-1}a(r)=1$.

Singular value decomposition is performed on the average result Z(t) to obtain the principal eigenvector, and the downlink channel is reconstructed according to the principal eigenvector.

(c) The Alpha filter algorithm: This algorithm is applied to a scenario in which a change of a channel along with time cannot be neglected.

Matrices corresponding to the multiple different optimal code words returned by the terminal are calculated to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t.

Weighting is performed according to the multiple intermediate variables to obtain an average result Z(t), where $$Z(t)=\alpha Z(t-1)+(1-\alpha)Y_t, \text{ and } 0<\alpha<1.$$

Singular value decomposition is performed on the average result Z(t) to obtain the principal eigenvector, and the downlink channel is reconstructed according to the principal eigenvector.

A second reconstruction method is a technology for reconstructing entire channel state information. The entire channel state information refers to a principal eigenvector of a channel-related matrix. Specifically, the method includes the following operations.

(1) Calculation is performed by multiplying a pilot weighting matrix $Q_{s(t)}$ used for each pilot weighting, by a matrix w(t) corresponding to an optimal code word returned by the terminal, where $$A_t=[a_{t,1},L,a_{t,N_T}]^T=Q_{s(t)}w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t.

(2) The following $N_T^2$-dimension real vector is constructed by using an $N_T$-dimension complex vector $A_t$, where $$b_t=[e_1,L,e_{N_T},f_{1,2},g_{1,2}L,f_{1,N_T}g_{1,N_T},f_{2,3},g_{2,3}L,f_{2,N_T}g_{2,N_T}L,f_{N_T-1,N_T}g_{N_T-1,N_T}]^T;$$

k and l are free variables, $e_k=|a_{t,k}|^2$, $f_{k,l}=2R(a_{t,k}^*a_{t,l})$, $g_{k,l}=-2I(a_{t,k}^*a_{t,l})$, R(g) represents an operation of obtaining a real part of a complex number, I(g) represents an operation of obtaining an imaginary part of a complex number.

(3) A linear function (1) is formed according to multiple real vectors $b_t$, and the linear function (1) is solved to obtain a vector $X=[x_1 \ L \ x_{N_T^2}]^T$, where $$[b_t \ L \ b_{t-T+1}]^T \begin{bmatrix} x_1 \\ M \\ x_{N_T^2} \end{bmatrix} = \begin{bmatrix} \hat{\gamma}_t \\ M \\ \hat{\gamma}_{t-T+1} \end{bmatrix}, \quad (1)$$

$\hat{\gamma}$ is a quantized value of $\gamma$, $$\gamma = \frac{P}{N_0} w^H H^H H w,$$

P is a transmit power of the base station, $N_o$ is a downlink-noise interference power measured by the terminal, $$w = \max_{w_i \in W} w_i^H H^H H w_i,$$

$W=\{w_0, L, w_{L-1}\}$ is a precoding codebook, L is a quantity of precoding matrices $w_i$ in the precoding codebook, $H=\{h_0, L, h_{N_T}\}$, and $h_i$ represents a channel from an antenna port i of the base station to each antenna of a user.

To obtain the vector $X=[x_1 \ L \ x_{N_T^2}]^T$, classified discussion on cases of a matrix $B=[b_t \ L \ b_{t-T+1}]^T$ and a vector $c=[\hat{\gamma}_t \ L \ \hat{\gamma}_{t-T+1}]^T$ is required:

(a) If $T=N_T^2$ and B is full rank, $x=B^{-1}c$;

(b) If $T<N_T^2$ and rows of are full rank, $x=B^H(BB^H)^{-1}c$;

(c) If $T<N_T^2$ and rows of B are not full rank, assuming that a rank of B is r, first, elementary row transformation needs to be performed on an augmented matrix [B c], to transform the augmented matrix [B c] to an upper triangular matrix; a new matrix $B_{up}$ is constructed by using upper r rows of B that are from a transformation result, and a new vector $c_{up}$ is constructed by using the part of upper r rows of c that are from the transformation result; and then $x=B_{up}^H(B_{up}B_{up}^H)^{-1}c_{up}$ is calculated.

(4) A relationship between elements of a channel-related matrix $\hat{R}$ and elements of the vector x is reconstructed as follows:

$$\hat{R} = \begin{bmatrix} \hat{r}_{1,1} & \hat{r}_{1,2} & L & \hat{r}_{1,N_T} \\ \hat{r}_{1,2}^* & \hat{r}_{2,2} & L & \hat{r}_{2,N_T} \\ M & M & O & M \\ \hat{r}_{1,N_T}^* & \hat{r}_{2,N_T}^* & L & \hat{r}_{N_T,N_T} \end{bmatrix},$$

where a diagonal element of $\hat{R}$ is $\hat{r}_{k,k}=x_k$;

an upper triangular element of $\hat{R}$ is $\hat{r}_{k,l}=x_{p(k,l)}+j\cdot x_{p(k,l)+1}$, k=1, L, $N_T-1$; k<l;

the subscript $p(k,l)=N_T+(2N_T-k)(k-1)+2(l-k-1)+1$, where k and l are free variables, and $N_T$ is a quantity of antenna ports of the base station; and a lower triangular element of $\hat{R}$ and an upper triangular element of $\hat{R}$ are conjugately symmetrical around a diagonal.

Assuming that a real downlink channel matrix of the terminal is H, where H is an $N_R \times N_T$-dimension complex matrix, $N_R$ is a quantity of receive antennas of the terminal, and $N_T$ is a quantity of transmit antennas of the base station, and the terminal feeds back CQI/PMI of Rank=1, a matrix corresponding to the code word that is fed back is:

$$w = \max_{w_i \in W} w_i^H H^H H w_i.$$

$W = \{w_0, L, w_{L-1}\}$ is a precoding codebook, L is a quantity of precoding matrices $w_i$ in the precoding codebook, and a matrix corresponding to each code word is one $N_T$-dimension complex vector (a column vector). Singular value decomposition performed for a channel is $H = U\Sigma V^H$, where $\Sigma$ is a diagonal matrix formed by singular values of H and diagonal elements are ranked in descending order, columns of V are eigenvectors of H, and the first column $v_1$ is a principal eigenvector. Therefore, the matrix corresponding to the code word that is fed back may be represented as:

$$w = \alpha e^{j\theta} v_1 + \sqrt{1 - \alpha^2} e, \text{ where}$$

a positive number α represents a correlation between the principal eigenvector of the real channel and the matrix corresponding to the code word, θ is a rotation phase, and e is a quantization error vector that is orthogonal with a truth value $v_1$.

A signal-to-noise ratio corresponding to the matrix corresponding to the code word is:

$$\gamma = \frac{P}{N_0} w^H H^H H w.$$

P is a transmit power of the base station, $N_o$ is a downlink-noise interference power measured by the terminal, and w is a matrix in the precoding matrices. The CQI fed back by the terminal is an index value to which γ is mapped according to a given SNR quantization table, where the quantization table is predetermined by the terminal and the base station. An SNR obtained after quantizing γ is recorded as $\hat{\gamma}$.

Weighting is performed on an original pilot signal, and a weighted pilot signal is transmitted. Assuming that a weighting matrix used is $Q_s$, an equivalent downlink channel "seen" by the terminal changes to $H_s^\% = HQ_s = U\Sigma V^H Q_s$. The designed $Q_s$ must be a unitary matrix, and therefore, the SVD of the equivalent channel is performed: $H_s^\% = U\Sigma (V_s^\%)^H$, where columns of $V_s^\% = Q_s^H V$ are eigenvectors of the equivalent channel, and the first column $v_{s,1}^\% = Q_s^H v_1$ is a principal eigenvector of the equivalent channel. A relationship between the matrix corresponding to the code word and the principal eigenvector of the equivalent channel is:

$$w_s = \alpha_s e^{j\theta_s} Q_s^H v_1 + \sqrt{1 - \alpha_s^2} e_s.$$

Theoretically, if matrices $Q_0, L, Q_{s-1}$ used for all times of weighting are independent from each other, $v_{s,1}^\% = Q_s^H v_1$ may be in independent directions after transformation is performed, and therefore, an error of each quantization is also independent. In this principle, after inverse transformation is performed on precoding matrices corresponding to PMI code words that are fed back, results of the inverse transformation are obtained, and related matrices of the results are averaged:

$$Z = \frac{1}{S}\sum_{s=0}^{S-1} Q_s w_s w_s^H Q_s^H = \left(\frac{1}{S}\sum_{s=0}^{S-1} a_s^2\right) v_1 v_1^H + Z_{ve} + Z_{ve}^H + Z_{ee}, \text{ where}$$

$$Z_{ve} = \frac{1}{S}\sum_{s=0}^{S-1} a_s \sqrt{1 - a_s^2}\, e^{j\theta_s} v_1 e_s^H Q_s^H \text{ and}$$

$$Z_{ee} = \frac{1}{S}\sum_{s=0}^{S-1} (1 - a_s^2) Q_s e_s e_s^H Q_s^H.$$

$e_s$ is orthogonal with $Q_s^H v_1$, and therefore, a cross-correlation item $Z_{ve}$ is 0, and an error cumulative item $Z_{ee}$ tends to 0 as a quantity of pilot weighting times S increases.

According to an embodiment of the present invention, the base station sends the different weighted pilot signals to the terminal for multiple times; after receiving the multiple different weighted pilot signals, the terminal performs channel estimation according to the multiple different weighted pilot signals and returns the multiple optimal code words according to the channel estimation result; and then, the base station performs reconstruction according to the multiple optimal code words. A quantization error is reduced when averaging is performed according to the multiple optimal code words, so that a beam direction of a reconstructed channel correctly points to the terminal.

An embodiment of the present invention further provides a downlink channel reconstruction apparatus, including a sending module, a calculation module, and a reconstruction module.

The sending module is configured to send multiple different weighted pilot signals to a terminal, where each of the weighted pilot signals is equal to a product of a pilot signal and a weighting matrix.

The calculation module is configured to receive multiple different optimal code words returned by the terminal, where each of the optimal code words is obtained based on a channel estimation of a weighted pilot signal.

The reconstruction module is configured to reconstruct a downlink channel according to the multiple different optimal code words.

In one embodiment, the apparatus further includes a generation module.

The generation module is configured to generate a pilot weighting codebook, where the pilot weighting codebook includes multiple different weighting matrices.

The calculation module is configured to multiply the multiple different weighting matrices by the pilot information, to obtain the multiple different weighted pilot signals.

In one embodiment, the generation module is configured to generate a pilot weighting codebook $Q^{dist}$:

$$Q^{dist} = \left\{ Q_s^{dist} \mid Q_s^{dist} = I_{N_T} - 2\frac{u_s^{dist}(u_s^{dist})^H}{u_s^{2\,dist}}, s = 0, L, S - 1 \right\},$$

where $I_{N_T}$ is an $N_T$-dimension identity matrix, $N_T$ a quantity of antenna ports of a base station, s is a sequence number variable, S is a quantity of elements of the pilot weighting codebook $Q^{dist}$, $\mu_s^{dist} = (u_0^{dist}, u_1^{dist}, L, u_{S-1}^{dist})$, $$\mu_s^{dist} = \arg\max_{\mu_r} \min_{i \neq j} d(u_{r,i}, u_{r,j}),$$
$$r=0,L,R u_{r,i}, u_{r,j} \in \mu_r$$

i, j, and r are free variables, R is a positive integer, $$\mu_r = \left\{ u_{r,s} \mid u_{r,s} = \frac{v_{r,s}}{v_{r,s}}, s = 0, \ldots, S-1 \right\},$$

and $v_{r,s}$ is an element in a random $N_T$-dimension complex vector set $\{v_{r,0}, \ldots, v_{r,S-1}\}$.

In one embodiment, the generation module is configured to generate a pilot weighting codebook $Q^{ang}$:

$$Q^{ang} = \left\{ Q_s^{ang} \mid Q_s^{ang} = I_{N_T} - 2 \frac{u_s^{ang}(u_s^{ang})^H}{u_s^{2ang}}, s = 0, L, S-1 \right\},$$

where $I_{N_T}$ is an $N_T$-dimension identity matrix, $N_T$ is a quantity of antenna ports of a base station, S is a sequence number variable, S is a quantity of elements of the pilot weighting codebook $Q^{ang}$:

$$u_s^{ang} = \begin{bmatrix} \begin{bmatrix} 1 \\ e^{j\theta_s} \\ e^{j2\theta_s} \\ L \\ e^{j\left(\frac{N_T}{2}-1\right)\theta_s} \end{bmatrix} \\ \begin{bmatrix} 1 \\ e^{j\theta_s} \\ e^{j2\theta_s} \\ L \\ e^{j\left(\frac{N_T}{2}-1\right)\theta_s} \end{bmatrix} e^{j\varphi_s} \end{bmatrix};$$

and a value range of $\theta_S$ is $$\left(0, \frac{\pi}{4}\right),$$

and a value range of $\varphi_S$ is $$\left(0, \frac{\pi}{2}\right).$$

In one embodiment, the reconstruction module includes:

a calculation unit, configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and $w(t)$ is a precoding matrix corresponding to an optimal code word that is returned by the terminal according to the weighted pilot signal sent at the time point t;

an averaging unit, performing weighting according to the multiple intermediate variables to obtain an average result Z(t), where $$Z(t) = \frac{1}{S} \sum_{r=0}^{S-1} Y(t-r),$$

r is an free variable, and S is a quantity of the intermediate variables; and a reconstruction unit, configured to perform singular value decomposition on the average result Z(t) to obtain a principal eigenvector, and reconstruct the downlink channel according to the principal eigenvector.

In one embodiment, the apparatus further includes:

a calculation unit, configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and $w(t)$ is a precoding matrix corresponding to an optimal code word that is returned by the terminal according to the weighted pilot signal sent at the time point t;

an averaging unit, configured to perform weighting according to the multiple intermediate variables to obtain an average result Z(t), where $$Z(t) = \frac{1}{S} \sum_{r=0}^{S-1} a(r) Y(t-r);$$

and r is an free variable, S is a quantity of the intermediate variables, $0 < a_0 < a_1 < L < a_{S-1} < 1$, and $\Sigma_{r=0}^{S-1} a(r) = 1$; and a reconstruction unit, configured to perform singular value decomposition on the average result Z(t) to obtain a principal eigenvector, and reconstruct the downlink channel according to the principal eigenvector.

In one embodiment, the apparatus further includes:

a calculation unit, configured to calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and $w(t)$ is a precoding matrix corresponding to an optimal code word that is returned by the terminal according to the weighted pilot signal sent at the time point t;

an averaging unit, configured to perform weighting according to the multiple intermediate variables to obtain an average result Z(t), where $$Z(t) = \alpha Z(t-1) + (1-\alpha) Y_t \text{ and } 0 < \alpha < 1; \text{ and}$$

a reconstruction unit, configured to perform singular value decomposition on the average result Z(t) to obtain a principal eigenvector, and reconstruct the downlink channel according to the principal eigenvector.

In one embodiment, the apparatus includes:

a construction unit, configured to construct multiple real vectors $b_t$ according to matrices corresponding to the multiple different optimal code words returned by the terminal, where $$b_t = [e_1, L, e_{N_T}, f_{1,2}, g_{1,2}, L, f_{1,N_T}, g_{1,N_T}, f_{2,3}, g_{2,3}, L, f_{2,N_T}, g_{2,N_T}, L, f_{N_T-1,N_T}, g_{N_T-1,N_T}]^T,$$

k and l are free variables, $e_k = |a_{t,k}|^2$, $f_{k,l} = 2R(a_{t,k}^* a_{t,l})$, $g_{k,l} = -2I(a_{t,k}^* a_{t,l})$, R(g) represents an operation of obtaining a real part of a complex number, I(g) represents an operation of obtaining an imaginary part of a complex number $[a_{t,l}, L, a_{t,N_T}]^T = Q_{s(t)} w(t)$, t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

a solving unit, configured to form a linear function (1) according to the multiple real vectors $b_t$, and solve the linear function (1) to obtain a vector $X = [x_1 \ L \ x_{N_T^2}]^T$, where $$[b_t \ L \ b_{t-T+1}]^T \begin{bmatrix} x_1 \\ M \\ x_{N_T^2} \end{bmatrix} = \begin{bmatrix} \hat{\gamma}_t \\ M \\ \hat{\gamma}_{t-T+1} \end{bmatrix}, \quad (1)$$

$\hat{\gamma}$ is a quantized value of $\gamma$, $$\gamma = \frac{P}{N_o} w^H H^H H w,$$

P is a transmit power of the base station, $N_o$ is a downlink-noise interference power measured by the terminal, $$w = \max_{w_i \in W} w_i^H H^H H w_i,$$

$W = \{w_0, L, w_{L-1}\}$ is a precoding codebook, L is a quantity of precoding matrices $w_i$ in the precoding codebook, $H = \{h_0, L, h_{N_T}\}$, and $h_i$ represents a channel from an antenna port i of the base station to each antenna of a user; and a reconstruction unit, configured to reconstruct a downlink channel $\hat{R}$ according to the vector $X = \{x_1 \ L \ x_{N_T^2}\}^T$, where $$\hat{R} = \begin{bmatrix} \hat{r}_{1,1} & \hat{r}_{1,2} & L & \hat{r}_{1,N_T} \\ \hat{r}_{1,2}^* & \hat{r}_{2,2} & L & \hat{r}_{2,N_T} \\ M & M & O & M \\ \hat{r}_{1,N_T}^* & \hat{r}_{2,N_T}^* & L & \hat{r}_{N_T,N_T} \end{bmatrix};$$

a diagonal element of $\hat{R}$ is $\hat{r}_{k,k} = x_k$;

an upper triangular element of $\hat{R}$ is $\hat{r}_{k,l} = x_{p(k,l)} + j \cdot x_{p(k,l)+1}$, $k=1, L, N_T-1$; k<l;

where the subscript $p(k,l) = N_T + (2N_T - k)(k-1) + 2(l-k-1) + 1$, where k and l are free variables, and $N_T$ is a quantity of antenna ports of the base station; and a lower triangular element of $\hat{R}$ and an upper triangular element of $\hat{R}$ are conjugately symmetrical around a diagonal.

Figure 1:
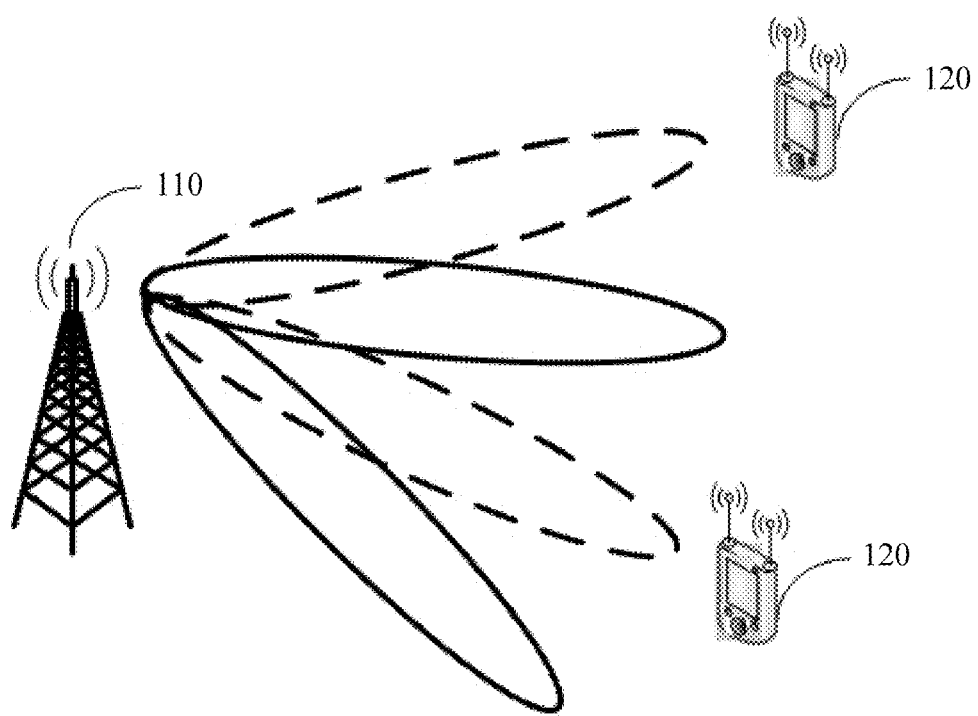
FIG. 1 is a diagram of a direction error generated when a base station sends a beam to a terminal in the prior art.

The downlink channel reconstruction apparatus provided in the present invention is corresponding to the downlink channel reconstruction method shown in FIG. 1. For details, refer to FIG. 1 and related descriptions. Details are not described herein again.

According to an embodiment of the present invention, the base station sends the different weighted pilot signals to the terminal for multiple times; after receiving the multiple different weighted pilot signals, the terminal performs channel estimation according to the multiple different weighted pilot signals and returns the multiple optimal code words according to a channel estimation result; and then, the base station performs reconstruction according to the multiple optimal code words. A quantization error is reduced when averaging is performed according to the multiple optimal code words, so that a beam direction of a reconstructed channel correctly points to the terminal.

Figure 3:
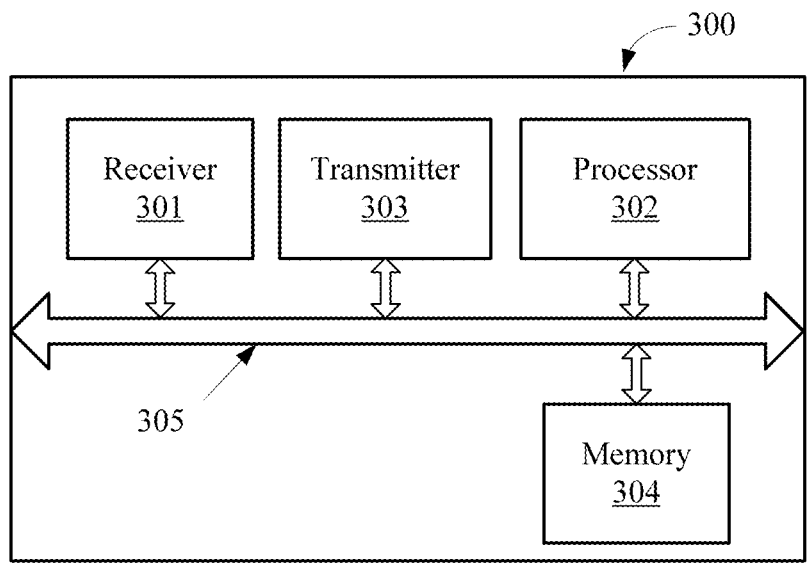
FIG. 3 is a schematic structural diagram of a downlink channel reconstruction apparatus according to the present invention.

Referring to FIG. 3, FIG. 3 is an embodiment of a base station provided in the present invention. A base station 300 in this embodiment includes: a receiver 301, a processor 302, a transmitter 303, and a memory 304.

The receiver 301 and the transmitter 303 may be disposed independently or may be disposed in a combination manner. For example, when the receiver 301 and the transmitter 303 are disposed in a combination manner, the receiver 301 and the transmitter 303 include an RF circuit. The RF circuit may be configured to: receive and send a signal during information receiving and transmitting or during a call; in particular, send, after receiving uplink information of a terminal, the uplink information to one or more processors 302 for processing; and in addition, send downlink-related data to the terminal. Generally, the RF circuit includes but is not limited to an antenna, at least one amplifier, a tuner, one or more oscillators, a coupler, an LNA (low noise amplifier), and a duplexer. In addition, the RF circuit may communicate with a network and another device using wireless communication. The wireless communication may use any communications standard or protocol, including but without being limited to GSM (Global System for Mobile Communications), GPRS (general packet radio service), CDMA (Code Division Multiple Access), WCDMA (Wideband Code Division Multiple Access), LTE (Long Term Evolution), E-mail, and SMS (Short Messaging Service).

The memory 304 may include a read-only memory and a random access memory, and provides an instruction and data for the processor 302. A part of the memory 304 may further include a non-volatile random access memory (NVRAM).

The memory 304 stores the following elements, that is, an executable module or a data structure, or a subset thereof, or an extended set thereof:

operation instructions, including various operation instructions and used to implement various operations; and an operating system, including various system programs and used to implement various basic services and process hardware-based tasks.

In an embodiment of the present invention, the processor 302 invokes an operation instruction (the operation instruction may be stored in the operating system) stored in the memory 304, to execute the following operations:

instructing, by the processor 302, the transmitter 303 to send multiple different weighted pilot signals to the terminal, where the weighted pilot signal is equal to a product of a pilot signal and a weighting matrix;

instructing, by the processor 302, the receiver 301 to receive multiple different optimal code words returned by the terminal, where the optimal code word is obtained based on a channel estimation of the weighted pilot signal; and reconstructing, by the processor 302, a downlink channel according to the multiple different optimal code words.

According to an embodiment of the present invention, the base station sends the different weighted pilot signals to the terminal for multiple times; after receiving the multiple different weighted pilot signals, the terminal performs channel estimation according to the multiple different weighted pilot signals and returns the multiple optimal code words according to a channel estimation result; and then, the base station performs reconstruction according to the multiple optimal code words. A quantization error is reduced when averaging is performed according to the multiple optimal code words, so that a beam direction of a reconstructed channel correctly points to the terminal.

The processor 302 controls operations of the base station 300, and the processor 302 may also be referred to as a CPU (central processing unit). The memory 304 may include a read-only memory and a random access memory, and provides an instruction and data for the processor 302. A part of the memory 304 may further include a non-volatile random access memory (NVRAM). In a specific application, components of the base station 300 are coupled together by using a bus system 305. In addition to a data bus, the bus system 305 may include a power bus, a control bus, a status signal bus, and the like. However, for clear description, various buses are represented by the bus system 305 in the figure.

The methods disclosed in the foregoing embodiments of the present invention can be applied to the processor 302, or implemented by the processor 302. The processor 302 may be an integrated circuit chip with a signal processing capability. In one embodiment, the operations of the foregoing method may be implemented using an integrated logic circuit of hardware in the processor 302 or by using an instruction in a form of software. The foregoing processor 302 may be a general purpose processor, a digital signal processor (DSP), an application-specific integrated circuit (ASIC), a field programmable gate array (FPGA), or another programmable logic device, a discrete gate or a transistor logic device, or a discrete hardware component. The processor 302 may implement or execute methods, operations and logical block diagrams disclosed in the embodiments of the present invention. The general purpose processor may be a microprocessor, or the processor may be any conventional processor or the like. The operations of the methods disclosed with reference to the embodiments of the present invention may be directly implemented by a hardware decoding processor, or may be implemented by a combination of hardware and a software module in a decoding processor. The software module may be located in a mature storage medium in the art, such as a random access memory, a flash memory, a read-only memory, a programmable read-only memory or an electrically erasable programmable memory, or a register. The storage medium is located in the memory 304, and the processor 302 reads information in the memory 304 and completes the operations of the foregoing method with reference to hardware of the processor 302.

In one embodiment, the processor 302 is further configured to: generate a pilot weighting codebook, where the pilot weighting codebook includes multiple different weighting matrices; multiply the multiple different weighting matrices by the pilot information, to obtain the multiple different weighted pilot signals.

In one embodiment, the processor 302 is further configured to generate a pilot weighting codebook $Q^{dist}$:

$$Q^{dist} = \left\{ Q_s^{dist} \mid Q_s^{dist} = I_{N_T} - 2 \frac{u_s^{dist}(u_s^{dist})^H}{u_s^{2dist}}, s = 0, L, S-1 \right\},$$

where $I_{N_T}$ is an $N_T$-dimension identity matrix, $N_T$ is a quantity of antenna ports of the base station, s is a sequence number variable, S is a quantity of elements of the pilot weighting codebook $Q^{dist}$, $\mu_s^{dist} = (u_0^{dist}, u_1^{dist}, L, u_{S-1}^{dist})$, $$\mu_s^{dist} = \underset{\substack{\mu_r \\ r=0,L,R u_{r,i}, u_{r,j} \in \mu_r}}{\operatorname{argmax}} \min_{i \neq j} d(u_{r,i}, u_{r,j}),$$

i, j, and r are free variables, R is a positive integer, $$\mu_r = \left\{ u_{r,s} \mid u_{r,s} = \frac{v_{r,s}}{v_{r,s}}, s = 0, \ldots, S-1 \right\},$$

and $v_{r,s}$ is an element in a random $N_T$-dimension complex vector set $\{v_{r,0}, \ldots, v_{r,S-1}\}$.

In one embodiment, the processor 302 is further configured to generate a pilot weighting codebook $Q^{ang}$:

$$Q^{ang} = \left\{ Q_s^{ang} \mid Q_s^{ang} = I_{N_T} - 2 \frac{u_s^{ang}(u_s^{ang})^H}{u_s^{2ang}}, s = 0, L, S-1 \right\},$$

$I_{N_T}$ is an $N_T$-dimension identity matrix, $N_T$ a quantity of antenna ports of the base station, a is a sequence number variable, S is a quantity of elements of the pilot weighting codebook $Q^{ang}$:

$$u_s^{ang} = \begin{bmatrix} \begin{bmatrix} 1 \\ e^{j\theta_s} \\ e^{j2\theta_s} \\ L \\ e^{j\left(\frac{N_T}{2}-1\right)\theta_s} \end{bmatrix} \\ \begin{bmatrix} 1 \\ e^{j\theta_s} \\ e^{j2\theta_s} \\ L \\ e^{j\left(\frac{N_T}{2}-1\right)\theta_s} \end{bmatrix} e^{j\varphi_s} \end{bmatrix};$$

and a value range of $\theta_S$ is $$\left(0, \frac{\pi}{4}\right),$$

and a value range of $\varphi_S$ is $$\left(0, \frac{\pi}{2}\right).$$

In one embodiment, the processor 302 is further configured to: calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

perform weighting according to the multiple intermediate variables to obtain an average result Z(t), where $$Z(t) = \frac{1}{S} \sum_{r=0}^{S-1} Y(t-r);$$

and r is an free variable, and S is a quantity of the intermediate variables; and perform singular value decomposition on the average result Z(t) to obtain a principal eigenvector, and reconstruct the downlink channel according to the principal eigenvector.

In one embodiment, the processor 302 is further configured to: calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

perform weighting according to the multiple intermediate variables to obtain an average result Z(t), where $$Z(t) = \frac{1}{S} \sum_{r=0}^{S-1} a(r) Y(t-r);$$

and r is an free variable, S is a quantity of the intermediate variables, $0 < a_0 < a_1 < L < a_{S-1} < 1$, and $\Sigma_{r=0}^{S-1} a(r) = 1$; and perform singular value decomposition on the average result Z(t) to obtain a principal eigenvector, and reconstruct the downlink channel according to the principal eigenvector.

In one embodiment, the processor 302 is further configured to: calculate matrices corresponding to the multiple different optimal code words returned by the terminal, to obtain multiple intermediate variables $Y_t$, where $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

perform weighting according to the multiple intermediate variables to obtain an average result Z(t), where $$Z(t) = \alpha Z(t-1) + (1-\alpha) Y_t, \text{ and } 0 < \alpha < 1; \text{ and}$$

perform singular value decomposition on the average result Z(t) to obtain a principal eigenvector, and reconstruct the downlink channel according to the principal eigenvector.

In one embodiment, the processor 302 is further configured to: construct multiple real vectors $b_t$ according to matrices corresponding to the multiple different optimal code words returned by the terminal, where $$b_t = [e_1, L, e_{N_T}, f_{1,2}, g_{1,2}, L, f_{1,N_T}, g_{1,N_T}, f_{2,3}, g_{2,3}, L, f_{2,N_T}, g_{2,N_T}, L, f_{N_T-1,N_T}, g_{N_T-1,N_T}]^T,$$

k and l are free variables, $e_k = |a_{t,k}|^2$, $f_{k,l} = 2R(a_{t,k}^* a_{t,l})$, $g_{k,l} = -2I(a_{t,k}^* a_{t,l})$, R(g) represents an operation of obtaining a real part of a complex number, I(g) represents an operation of obtaining an imaginary part of a complex number $[a_{t,l}, L, a_{t,N_T}]^T = Q_{s(t)} w(t)$, t is a time point at which a weighted pilot signal is sent, $Q_{s(t)}$ is a weighting matrix used for the weighted pilot signal that is sent at the time point t, and w(t) is a precoding matrix corresponding to an optimal code word that is returned by the terminal according to the weighted pilot signal sent at the time point t;

forming a linear function (1) according to the multiple real vectors $b_t$, and solve the linear function (1) to obtain a vector $X = [x_1 \ L \ x_{N_T^2}]^T$, where $$[b_t \ L \ b_{t-T+1}]^T \begin{bmatrix} x_1 \\ M \\ x_{N_T^2} \end{bmatrix} = \begin{bmatrix} \hat{\gamma}_t \\ M \\ \hat{\gamma}_{t-T+1} \end{bmatrix}, \quad (1)$$

$\hat{\gamma}$ is a quantized value of $\gamma$, $$\gamma = \frac{P}{N_0} w^H H^H H w,$$

P is a transmit power of the base station, $N_o$ is a downlink-noise interference power measured by the terminal, $$w = \max_{w_i \in W} w_i^H H^H H w_i,$$

$W = \{w_0, L, w_{L-1}\}$ is a precoding codebook, L is a quantity of precoding matrices $w_i$ in the precoding codebook, $H = \{h_0, L, h_{N_T}\}$, and $h_i$ represents a channel from an antenna port i of the base station to each antenna of a user; and reconstruct a downlink channel $\hat{R}$ according to the vector $X=\{x_1 \ L \ x_{N_T^2}\}^T$, where $$\hat{R} = \begin{bmatrix} \hat{r}_{1,1} & \hat{r}_{1,2} & L & \hat{r}_{1,N_T} \\ \hat{r}_{1,2}^* & \hat{r}_{2,2} & L & \hat{r}_{2,N_T} \\ M & M & O & M \\ \hat{r}_{1,N_T}^* & \hat{r}_{2,N_T}^* & L & \hat{r}_{N_T,N_T}^* \end{bmatrix};$$

a diagonal element of $\hat{R}$ is $\hat{r}_{k,k}=x_k$;
an upper triangular element of $\hat{R}$ is $\hat{r}_{k,l}=x_{p(k,l)}+j \cdot x_{p(k,l)+1}$, $k=1, L, N_T-1$; $k<l$;
where the subscript $p(k,l)=N_T+(2N_T-k)(k-1)+2(l-k-1)+1$, where k and l are free variables, and $N_T$ is a quantity of antenna ports of the base station; and
a lower triangular element of $\hat{R}$ and an upper triangular element of $\hat{R}$ are conjugately symmetrical around a diagonal.

According to an embodiment of the present invention, the base station sends the different weighted pilot signals to the terminal for multiple times; after receiving the multiple different weighted pilot signals, the terminal performs channel estimation according to the multiple different weighted pilot signals and returns the multiple optimal code words according to a channel estimation result; and then, the base station performs reconstruction according to the multiple optimal code words. A quantization error is reduced when averaging is performed according to the multiple optimal code words, so that a beam direction of a reconstructed channel correctly points to the terminal.

In some embodiments provided in this application, it should be understood that the disclosed system, apparatus, and method may be implemented in other manners. For example, the described apparatus embodiment is an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor to perform all or a part of the operations of the methods described in the implementations of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A downlink channel reconstruction method, comprising:
generating a pilot weighting codebook, wherein the pilot weighting codebook comprises multiple different weighting matrices;
multiplying the multiple different weighting matrices by pilot signals to obtain multiple different weighted pilot signals;
sending, by a base station, the multiple different weighted pilot signals to a terminal;
receiving, by the base station, multiple different optimal code words returned by the terminal, wherein each of the optimal code words is obtained based on a channel estimation of a weighted pilot signal; and
reconstructing, by the base station, a downlink channel according to the multiple different optimal code words.

2. The method according to claim 1, wherein the pilot weighting codebook is $Q^{dist}$:

$$Q^{dist} = \left\{ Q_s^{dist} \mid Q_s^{dist} = I_{N_T} - 2\frac{u_s^{dist}(u_s^{dist})^H}{u_s^{2dist}}, s = 0, L, S-1 \right\},$$

wherein
$I_{N_T}$ is an $N_T$-dimension identity matrix, $N_T$ is a quantity of antenna ports of the base station, s is a sequence number variable, S is a quantity of elements of the pilot weighting codebook $Q^{dist}$, $\mu_s^{dist}=(u_0^{dist}, u_1^{dist}, L, u_{S-1}^{dist})$, $$\mu_s^{dist} = \underset{\substack{\mu_r \\ r=0,L,R u_{r,i}, u_{r,j} \in \mu_r}}{\mathrm{argmax}} \ \underset{i \neq j}{\min} d(u_{r,i}, u_{r,j}),$$

i, j, and r are free variables, R is a positive integer, $$\mu_r = \left\{ u_{r,s} \mid u_{r,s} = \frac{v_{r,s}}{v_{r,s}}, s = 0, \ldots, S-1 \right\},$$

and $v_{r,s}$ is an element in a random $N_T$-dimension complex vector set $\{v_{r,0}, \ldots, v_{r,S-1}\}$.

3. The method according to claim 1, wherein the pilot weighting codebook is $Q^{ang}$:

$$Q^{ang} = \left\{ Q_s^{ang} \mid Q_s^{ang} = I_{N_T} - 2\frac{u_s^{ang}(u_s^{ang})^H}{u_s^{2ang}}, s = 0, L, S-1 \right\},$$

wherein
$I_{N_T}$ is an $N_T$-dimension identity matrix, $N_T$ is a quantity of antenna ports of the base station, S is a sequence number variable, S is a quantity of elements of the pilot weighting codebook $Q^{ang}$;

$$u_s^{ang} = \begin{bmatrix} \begin{bmatrix} 1 \\ e^{j\theta_s} \\ e^{j2\theta_s} \\ L \\ e^{j(\frac{N_T}{2}-1)\theta_s} \end{bmatrix} \\ \begin{bmatrix} 1 \\ e^{j\theta_s} \\ e^{j2\theta_s} \\ L \\ e^{j(\frac{N_T}{2}-1)\theta_s} \end{bmatrix} e^{j\varphi_s} \end{bmatrix};$$

and a value range of $\theta_S$ is $$\left(0, \frac{\pi}{4}\right),$$

and a value range of $\varphi_S$ is $$\left(0, \frac{\pi}{2}\right).$$

4. The method according to claim 1, wherein the reconstructing a downlink channel according to the multiple different optimal code words comprises:
calculating matrices corresponding to the multiple different optimal code words returned by the terminal, to obtain multiple intermediate variables $Y_t$, wherein $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at time t, and w(t) is a precoding matrix corresponding to an optimal code word that is returned by the terminal according to the weighted pilot signal sent at time t;
performing weighting according to the multiple intermediate variables $Y_t$ to obtain an average result Z(t), wherein $$Z(t) = \frac{1}{S} \sum_{r=0}^{S-1} Y(t-r),$$

r is an free variable, and S is a quantity of the intermediate variables $Y_t$; and
performing singular value decomposition on the average result Z(t) to obtain a principal eigenvector, and reconstructing the downlink channel according to the principal eigenvector.

5. The method according to claim 1, wherein the reconstructing a downlink channel according to the multiple different optimal code words comprises:
calculating matrices corresponding to the multiple different optimal code words returned by the terminal, to obtain multiple intermediate variables $Y_t$, wherein $$Y_t = y_t y_t^H;$$

$$y_t = Q_{s(t)} w(t); \text{ and}$$

t is a time at which a weighted pilot signal is sent, $Q_{s(t)}$ is a weighting matrix used for the weighted pilot signal that is sent at time t, and w(t) is a precoding matrix corresponding to an optimal code word that is returned by the terminal according to the weighted pilot signal sent at time t;
performing weighting according to the multiple intermediate variables to obtain an average result Z(t), wherein $$Z(t) = \frac{1}{S} \sum_{r=0}^{S-1} Y(t-r);$$

and r is an free variable, S is a quantity of the intermediate variables, $0 < a_0 < a_1 < L < a_{S-1} < 1$, and $\sum_{r=0}^{S-1} a(r) = 1$; and
performing singular value decomposition on the average result Z(t) to obtain a principal eigenvector, and reconstructing the downlink channel according to the principal eigenvector.

6. The method according to claim 1, wherein the reconstructing a downlink channel according to the multiple different optimal code words comprises:
calculating matrices corresponding to the multiple different optimal code words returned by the terminal, to obtain multiple intermediate variables $Y_t$, wherein $$Y_t = y_t y_t^H;$$

$$y_t = Q_{s(t)} w(t); \text{ and}$$

t is a time point at which a weighted pilot signal is sent, $Q_{s(t)}$ is a weighting matrix used for the weighted pilot signal that is sent at time t, and w(t) is a precoding matrix corresponding to an optimal code word that is returned by the terminal according to the weighted pilot signal sent at time t;
performing weighting according to the multiple intermediate variables to obtain an average result Z(t), wherein $$Z(t) = \alpha Z(t-1) + (1-\alpha) Y_t \text{ and } 0 < \alpha < 1; \text{ and}$$

performing singular value decomposition on the average result Z(t) to obtain a principal eigenvector, and reconstructing the downlink channel according to the principal eigenvector.

7. The method according to claim 1, further comprising:
constructing multiple real vectors $b_t$ according to matrices corresponding to the multiple different optimal code words returned by the terminal, wherein $$b_t = [e_1, L, e_{N_T}, f_{1,2}, g_{1,2}, L, f_{1,N_T}, g_{1,N_T}, f_{2,3}, g_{2,3}, L, f_{2,N_T}, g_{2,N_T}, L, f_{N_T-1,N_T}, g_{N_T-1,N_T}]^T;$$

k and l are free variables, $e_k = |a_{t,k}|^2$, $f_{k,l} = 2R(a_{t,k}^* a_{t,l})$, $g_{k,l} = -2I(a_{t,k}^* a_{t,l})$, R(g) represents an operation of obtaining a real part of a complex number, I(g) represents an operation of obtaining an imaginary part of a complex number $[a_{t,l}, L, a_{t,N_T}]^T = Q_{s(t)} w(t)$, t is a time at which a weighted pilot signal is sent, $Q_{s(t)}$ is a weighting matrix used for the weighted pilot signal that is sent at time t, and w(t) is a precoding matrix corresponding to an optimal code word that is returned by the terminal according to the weighted pilot signal sent at time t;

forming a linear function (1) according to the multiple real vectors $b_t$, and solving the linear function (1) to obtain a vector $X=[x_1 \ L \ x_{N_T^2}]^T$, wherein $$[b_t \ L \ b_{t-T+1}]^T \begin{bmatrix} x_1 \\ M \\ x_{N_T^2} \end{bmatrix} = \begin{bmatrix} \hat{\gamma}_t \\ M \\ \hat{\gamma}_{t-T+1} \end{bmatrix}, \quad (1)$$

$\hat{\gamma}$ is a quantized value of $\gamma$, $$\gamma = \frac{P}{N_o} w^H H^H H w,$$

P is a transmit power of the base station, $N_o$ is a downlink-noise interference power measured by the terminal, $$w = \max_{w_i \in W} w_i^H H^H H w_i,$$

$W=[w_0, L, w_{L-1}]$ is a precoding codebook, L is a quantity of precoding matrices $w_i$ in the precoding codebook, $H=[h_0, L, h_{N_T}]$, and $h_i$ represents a channel from an antenna port i of the base station to each antenna of a user; and reconstructing a downlink channel $\hat{R}$ according to the vector $X=[x_1 \ L \ x_{N_T^2}]^T$, wherein $$\hat{R} = \begin{bmatrix} \hat{r}_{1,1} & \hat{r}_{1,2} & L & \hat{r}_{1,N_T} \\ \hat{r}_{1,2}^* & \hat{r}_{2,2} & L & \hat{r}_{2,N_T} \\ M & M & O & M \\ \hat{r}_{1,N_T}^* & \hat{r}_{2,N_T}^* & L & \hat{r}_{N_T,N_T}^* \end{bmatrix};$$

a diagonal element of $\hat{R}$ is $\hat{r}_{k,k}=x_k$;
an upper triangular element of $\hat{R}$ is $\hat{r}_{k,l}=x_{p(k,l)}+j \cdot x_{p(k,l)+1}$, k=1, L, $N_T-1$; k<l;
where the subscript $p(k,l)=N_T+(2N_T-k)(k-1)+2(l-k-1)+1$, where k and l are free variables, and $N_T$ is a quantity of antenna ports of the base station; and
a lower triangular element of $\hat{R}$ and an upper triangular element of $\hat{R}$ are conjugately symmetric around a diagonal.

8. A downlink channel reconstruction apparatus, comprising
a processor; and
a non-transitory computer-readable storage medium coupled to the processor and storing programming instructions for execution by the processor, the programming instructions instruct the processor to:
generate a pilot weighting codebook, wherein the pilot weighting codebook comprises multiple different weighting matrices;
multiply the multiple different weighting matrices by pilot signals to obtain multiple different weighted pilot signals;
send the multiple different weighted pilot signals to a terminal;
receive multiple different optimal code words returned by the terminal, wherein each of the optimal code words is obtained based on a channel estimation of a weighted pilot signal; and
reconstruct a downlink channel according to the multiple different optimal code words.

9. The apparatus according to claim 8, wherein
the generation module is configured to generate a pilot weighting codebook $Q^{dist}$:

$$Q^{dist} = \left\{ Q_s^{dist} \mid Q_s^{dist} = I_{N_T} - 2\frac{u_s^{dist}(u_s^{dist})^H}{u_s^{2dist}}, s = 0, L, S-1 \right\},$$

wherein
$I_{N_T}$ is an $N_T$-dimension identity matrix, $N_T$ is a quantity of antenna ports of a base station, s is a sequence number variable, S is a quantity of elements of the pilot weighting codebook $Q^{dist}$, $\mu_s^{dist}=(u_0^{dist}, u_1^{dist}, L, u_{S-1}^{dist})$, $$\mu_s^{dist} = \arg\max_{\substack{\mu_r \\ r=0,L,R u_{r,i}, u_{e,j} \in \mu_r}} \min_{i \neq j} d(u_{r,i}, u_{r,j}),$$

i, j, and r are free variables, R is a positive integer, $$\mu_r = \left\{ u_{r,s} \mid u_{r,s} = \frac{v_{r,s}}{v_{r,s}}, s = 0, \ldots, S-1 \right\},$$

and $v_{r,s}$ is an element in a random $N_T$-dimension complex vector set $\{v_{r,0}, \ldots, v_{r,S-1}\}$.

10. The apparatus according to claim 8, wherein
the generation module is configured to generate a pilot weighting codebook $Q^{ang}$:

$$Q^{ang} = \left\{ Q_s^{ang} \mid Q_s^{ang} = I_{N_T} - 2\frac{u_s^{ang}(u_s^{ang})^H}{u_s^{2ang}}, s = 0, L, S-1 \right\},$$

wherein
$I_{N_T}$ is an $N_T$-dimension identity matrix, $N_T$ is a quantity of antenna ports of a base station, s is a sequence number variable, S is a quantity of elements of the pilot weighting codebook $Q^{ang}$;

$$u_s^{ang} = \begin{bmatrix} \begin{bmatrix} 1 \\ e^{j\theta_s} \\ e^{j2\theta_s} \\ L \\ e^{j(\frac{N_T}{2}-1)\theta_s} \end{bmatrix} \\ \begin{bmatrix} 1 \\ e^{j\theta_s} \\ e^{j2\theta_s} \\ L \\ e^{j(\frac{N_T}{2}-1)\theta_s} \end{bmatrix} e^{j\varphi_s} \end{bmatrix};$$

and
a value range of $\theta_S$ is $$\left(0, \frac{\pi}{4}\right),$$

and a value range of $\varphi_S$ is $$\left(0, \frac{\pi}{2}\right).$$

11. The apparatus according to claim 8, wherein the programming instructions further instruct the processor to:
calculate matrices corresponding to the multiple different optimal code words returned by the terminal, to obtain multiple intermediate variables $Y_t$, wherein $$Y_t = y_t y_t^H;$$

$$y_t = Q_{s(t)} w(t); \text{ and}$$

t is a time at which a weighted pilot signal is sent, $Q_{s(t)}$ is a weighting matrix used for the weighted pilot signal that is sent at time t, and w(t) is a precoding matrix corresponding to an optimal code word that is returned by the terminal according to the weighted pilot signal sent at time t; and perform weighting according to the multiple intermediate variables $Y_t$ to obtain an average result Z(t), wherein $$Z(t) = \frac{1}{S} \sum_{r=0}^{S-1} Y(t-r),$$

and
r is an free variable, and S is a quantity of the intermediate variables $Y_t$; and
perform singular value decomposition on the average result Z(t) to obtain a principal eigenvector, and reconstruct the downlink channel according to the principal eigenvector.

12. The apparatus according to claim 8, wherein the programming instructions further instruct the processor to:
calculate matrices corresponding to the multiple different optimal code words returned by the terminal, to obtain multiple intermediate variables $Y_t$, wherein $$Y_t = y_t y_t^H;$$

$$y_t = Q_{s(t)} w(t); \text{ and}$$

t is a time at which a weighted pilot signal is sent, $Q_{s(t)}$ is a weighting matrix used for the weighted pilot signal that is sent at time t, and w(t) is a precoding matrix corresponding to an optimal code word that is returned by the terminal according to the weighted pilot signal sent at time t; and perform weighting according to the multiple intermediate variables $Y_t$ to obtain an average result Z(t), wherein $$Z(t) = \frac{1}{S} \sum_{r=0}^{S-1} a(r) Y(t-r),$$

r is an free variable, S is a quantity of the intermediate variables $Y_t$, $0 < a_0 < a_1 < L < a_{S-1} < 1$, and $\Sigma_{r=0}^{S-1} a(r) = 1$; and perform singular value decomposition on the average result Z(t) to obtain a principal eigenvector, and reconstruct the downlink channel according to the principal eigenvector.

13. The apparatus according to claim 8, wherein the programming instructions further instruct the processor to:
calculate matrices corresponding to the multiple different optimal code words returned by the terminal, to obtain multiple intermediate variables $Y_t$, wherein $$Y_t = y_t y_t^H;$$

$$y_t = Q_{s(t)} w(t); \text{ and}$$

t is a time at which a weighted pilot signal is sent, $Q_{s(t)}$ is a weighting matrix used for the weighted pilot signal that is sent at time t, and w(t) is a precoding matrix corresponding to an optimal code word that is returned by the terminal according to the weighted pilot signal sent at time t; and perform weighting according to the multiple intermediate variables $Y_t$ to obtain an average result Z(t), wherein $$Z(t) = \alpha Z(t-1) + (1-\alpha) Y_t, \text{ and } 0 < \alpha < 1; \text{ and}$$

perform singular value decomposition on the average result Z(t) to obtain a principal eigenvector, and reconstruct the downlink channel according to the principal eigenvector.

14. The apparatus according to claim 8, wherein the programming instructions further instruct the processor to:
construct multiple real vectors $b_t$ according to matrices corresponding to the multiple different optimal code words returned by the terminal, wherein $$b_t = [e_1, L, e_{N_T}, f_{1,2}, g_{1,2}, L, f_{1,N_T}, g_{1,N_T}, f_{2,3}, g_{2,3}, L, f_{2,N_T}, g_{2,N_T}, L, f_{N_T-1,N_T}, g_{N_T-1,N_T}]^T;$$

k and l are free variables, $e_k = |a_{t,k}|^2$, $f_{k,l} = 2R(a_{t,k}^* a_{t,l})$, $g_{k,l} = -2I(a_{t,k}^* a_{t,l})$, R(g) represents an operation of obtaining a real part of a complex number, I(g) represents an operation of obtaining an imaginary part of a complex number, $[a_{t,1}, L, a_{t,N_T}]^T = Q_{s(t)} w(t)$, t is a time at which a weighted pilot signal is sent, $Q_{s(t)}$ is a weighting matrix used for the weighted pilot signal that is sent at time t, and w(t) is a precoding matrix corresponding to an optimal code word that is returned by the terminal according to the weighted pilot signal sent at time t;

form a linear function (1) according to the multiple real vectors $b_t$, and solve the linear function (1) to obtain a vector $X = [x_1 \ L \ x_{N_T^2}]^T$, wherein $$[b_t \ L \ b_{t-T+1}]^T \begin{bmatrix} x_1 \\ M \\ x_{N_T^2} \end{bmatrix} = \begin{bmatrix} \hat{\gamma}_t \\ M \\ \hat{\gamma}_{t-T+1} \end{bmatrix}, \quad (1)$$

$\hat{\gamma}$ is a quantized value of $\gamma$, $$\gamma = \frac{P}{N_0} w^H H^H H w,$$

P is a transmit power of the base station, $N_o$ is a downlink-noise interference power measured by the terminal, $$w = \max_{w_i \in W} w_i^H H^H H w_i,$$

$W=\{w_0, L, w_{L-1}\}$ is a precoding codebook, L is a quantity of precoding matrices $w_i$ in the precoding codebook, $H=\{h_0, L, h_{N_T}\}$, and $h_i$ represents a channel from an antenna port i of the base station to each antenna of a user; and reconstruct a downlink channel $\hat{R}$ according to the vector $X=\{x_1 \ L \ x_{N_T^2}\}^T$, wherein $$\hat{R} = \begin{bmatrix} \hat{r}_{1,1} & \hat{r}_{1,2} & L & \hat{r}_{1,N_T} \\ \hat{r}_{1,2}^* & \hat{r}_{2,2} & L & \hat{r}_{2,N_T} \\ M & M & O & M \\ \hat{r}_{1,N_T}^* & \hat{r}_{2,N_T}^* & L & \hat{r}_{N_T,N_T}^* \end{bmatrix};$$

a diagonal element of $\hat{R}$ is $\hat{r}_{k,k}=x_k$;
upper triangular element of $\hat{R}$ is $\hat{r}_{k,l}=x_{p(k,l)}+j \cdot x_{p(k,l)+1}$, k=1, L, $N_T-1$; k<l; $p(k,l)=N_T+(2N_T-k)(k-1)+2(l-k-1)+1$, wherein k and l are free variables, and $N_T$ is a quantity of antenna ports of the base station; and
a lower triangular element of $\hat{R}$ and an upper triangular element of $\hat{R}$ are conjugately symmetric around a diagonal.

15. A non-transitory machine-readable medium having instructions stored therein, which when executed by one or more processors, cause the one or more processors to perform operations, the operations comprising:
generating a pilot weighting codebook, wherein the pilot weighting codebook comprises multiple different weighting matrices;
multiplying the multiple different weighting matrices by pilot signals to obtain multiple different weighted pilot signals;
sending, by a base station, the multiple different weighted pilot signals to a terminal;
receiving, by the base station, multiple different optimal code words returned by the terminal, wherein each of the optimal code words is obtained based on a channel estimation of a weighted pilot signal; and
reconstructing, by the base station, a downlink channel according to the multiple different optimal code words.

16. The non-transitory machine-readable medium according to claim 15, wherein the pilot weighting codebook is $Q^{dist}$:

$$Q^{dist} = \left\{ Q_s^{dist} \mid Q_s^{dist} = I_{N_T} - 2\frac{u_s^{dist}(u_s^{dist})^H}{u_s^{2dist}}, s = 0, L, S-1 \right\},$$

wherein
$I_{N_T}$ is an $N_T$-dimension identity matrix, $N_T$ is a quantity of antenna ports of the base station, s is a sequence number variable, S is a quantity of elements of the pilot weighting codebook $Q^{dist}$, $\mu_s^{dist}=(u_0^{dist}, u_1^{dist}, L, u_{S-1}^{dist})$, $$\mu_s^{dist} = \underset{\substack{\mu_r \\ r=0,L,R u_{r,i}, u_{r,j} \in \mu_r}}{\operatorname{argmax}} \min_{i \neq j} d(u_{r,i}, u_{r,j}),$$

i, j, and r are free variables, R is a positive integer, and $$\mu_r = \left\{ u_{r,s} \mid u_{r,s} = \frac{v_{r,s}}{v_{r,s}}, s = 0, \ldots, S-1 \right\},$$

and $v_{r,s}$ is an element in a random $N_T$-dimension complex vector set $\{v_{r,0}, \ldots, v_{r,S-1}\}$.

17. The non-transitory machine-readable medium according to claim 15, wherein the pilot weighting codebook is $Q^{ang}$:

$$Q^{ang} = \left\{ Q_s^{ang} \mid Q_s^{ang} = I_{N_T} - 2\frac{u_s^{ang}(u_s^{ang})^H}{u_s^{2ang}}, s = 0, L, S-1 \right\},$$

wherein
$I_{N_T}$ is an $N_T$-dimension identity matrix, $N_T$ is a quantity of antenna ports of the base station, s is a sequence number variable, S is a quantity of elements of the pilot weighting codebook $Q^{ang}$;

$$u_s^{ang} = \begin{bmatrix} \begin{bmatrix} 1 \\ e^{j\theta_s} \\ e^{j2\theta_s} \\ L \\ e^{j(\frac{N_T}{2}-1)\theta_s} \end{bmatrix} \\ \begin{bmatrix} 1 \\ e^{j\theta_s} \\ e^{j2\theta_s} \\ L \\ e^{j(\frac{N_T}{2}-1)\theta_s} \end{bmatrix} e^{j\varphi_s} \end{bmatrix};$$

and
a value range of $\theta_S$ is $$\left(0, \frac{\pi}{4}\right),$$

and a value range of $\varphi_S$ is $$\left(0, \frac{\pi}{2}\right).$$

* * * * *